(12) United States Patent
Tomar et al.

(10) Patent No.: US 12,107,240 B2
(45) Date of Patent: Oct. 1, 2024

(54) SMART BATTERY MANAGEMENT SYSTEMS

(71) Applicant: Purdue Research Foundation, West Lafayette, IN (US)

(72) Inventors: Vikas Tomar, West Lafayette, IN (US); Thomas Edward Adams, West Lafayette, IN (US); Jonathan E. Alvarado, San Diego, CA (US); James Eric Dietz, West Lafayette, IN (US); Bing Li, West Lafayette, IN (US); Christian T. Neal, Pittsburgh, PA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/198,268

(22) Filed: May 16, 2023

(65) Prior Publication Data

US 2024/0170740 A1 May 23, 2024

Related U.S. Application Data

(62) Division of application No. 16/803,127, filed on Feb. 27, 2020, now Pat. No. 11,658,350.

(60) Provisional application No. 62/811,896, filed on Feb. 28, 2019.

(51) Int. Cl.
| | |
|---|---|
| *H01M 10/42* | (2006.01) |
| *B60L 53/63* | (2019.01) |
| *B60L 58/12* | (2019.01) |
| *B60L 58/24* | (2019.01) |
| *H01M 10/48* | (2006.01) |
| *H01M 50/574* | (2021.01) |

(52) U.S. Cl.
CPC ......... *H01M 10/4257* (2013.01); *B60L 53/63* (2019.02); *B60L 58/12* (2019.02); *B60L 58/24* (2019.02); *H01M 10/482* (2013.01); *H01M 10/486* (2013.01); *H01M 50/574* (2021.01); *H01M 2010/4278* (2013.01); *H01M 2220/20* (2013.01)

(58) Field of Classification Search
CPC .................................................. H01M 10/4257
USPC ........................................................... 429/7
See application file for complete search history.

(56) References Cited

U.S. PATENT DOCUMENTS

| | | | |
|---|---|---|---|
| 10,086,782 B1 * | 10/2018 | Konrardy | G08B 25/014 |
| 2009/0169977 A1 * | 7/2009 | Sfarzo | H01M 6/5044 |
| | | | 429/61 |
| 2010/0068607 A1 * | 3/2010 | Spare | H01M 10/48 |
| | | | 429/163 |
| 2013/0033118 A1 * | 2/2013 | Karalis | B60L 53/126 |
| | | | 307/104 |
| 2015/0061578 A1 * | 3/2015 | Keeling | B60L 53/122 |
| | | | 320/108 |
| 2015/0280290 A1 * | 10/2015 | Saha | H01M 10/4257 |
| | | | 324/426 |
| 2016/0134131 A1 * | 5/2016 | Murayama | B60L 53/126 |
| | | | 307/104 |
| 2017/0106738 A1 * | 4/2017 | Gillett | B62K 11/007 |

(Continued)

*Primary Examiner* — Mohammed Alam
(74) *Attorney, Agent, or Firm* — Piroozi-IP, LLC

(57) ABSTRACT

Various implementations of a smart battery management system are provided. An example method includes identifying sensor data of a cell in a battery system; predicting, based on the sensor data, a failure event of the cell; and preventing the failure event by activating a control circuit connected to the cell.

19 Claims, 9 Drawing Sheets

(56) References Cited

U.S. PATENT DOCUMENTS

| | | | |
|---|---|---|---|
| 2017/0117725 A1* | 4/2017 | Hendricks | G01K 1/026 |
| 2017/0222469 A1* | 8/2017 | Tustin | H02J 50/80 |
| 2017/0361723 A1* | 12/2017 | Elshaer | B60L 53/126 |
| 2018/0026454 A1* | 1/2018 | Belkacem-Boussaid | H02J 7/0019 |
| | | | 702/63 |
| 2018/0236879 A1* | 8/2018 | Elshaer | H02J 50/90 |
| 2019/0033396 A1* | 1/2019 | Karner | G01R 31/392 |

* cited by examiner

SMART BATTERY MANAGEMENT SYSTEMS

CROSS-REFERENCE TO RELATED APPLICATIONS

The present application is a divisional of the U.S. Non-Provisional application Ser. No. 16/803,127, which was filed on Feb. 27, 2020 which claims priority to U.S. Provisional Application No. 62/811,896, which was filed on Feb. 28, 2019, each of which is incorporated by reference herein in its entirety.

STATEMENT OF FEDERALLY SPONSORED RESEARCH OR DEVELOPMENT

This invention was made with Government support under Contract No. N00014-16-1-3109 awarded by the Office of Naval Research. The government has certain rights in the invention.

BACKGROUND

Batteries are an essential part of many electrical systems. Primary battery cells include electrical battery cells that are discarded after they are discharged. Secondary battery cells, on the other hand, can be discharged and recharged over the course of multiple cycles. Examples of secondary electrochemical battery cells include lithium-ion (Li-ion) cells, Li-ion polymer cells, lead-acid cells, nickel-cadmium (NiCd) cells, nickel-metal hydride (NiMH) cells, sodium-ion cells, lithium-sulfur cells, and the like.

Although recent advances in battery chemistry could be result in significant improvements in energy storage, some battery cells are prone to sudden and catastrophic failures that limit their practical applicability, particularly in sensitive applications. These failures can include sudden thermal events, such as explosions, that can be dangerous to operators and equipment. When the battery cells are relied upon by particularly sensitive systems, such as submarines, space capsules, nuclear remediation robots, and the like, battery reliability is essential.

A Battery Management System (BMS) may monitor metrics associated with a battery, which can be used to diagnose potential problems with the battery. However, further improvements to BMS technology could be used to improve the accuracy and operation of various types of batteries. In particular, an improved BMS could significantly improve the performance and applicability of secondary battery cells, which may be reused, such that they can be operated for an extended period of time.

SUMMARY

Various implementations of the present disclosure relate to Smart Battery Management Systems (SBMSs). According to various examples, an SBMS can be used to accurately monitor State of Health (SoH) of a battery cell, or multiple battery cells, during operation. In various cases, an SBMS can be used to predict battery cell failures in advance of the failures occurring. Accordingly, the SBMS can be used to prevent the failures by automatically load balancing and/or disconnecting battery cells that are in danger of failing.

An example method includes identifying sensor data of a cell in a battery system; predicting, based on the sensor data, a failure event of the cell; and preventing the failure event by activating a control circuit connected to the cell. In some examples, identifying the sensor data includes measuring, by a pressure sensor, a pressure associated with the cell, wherein the sensor data indicates the pressure. In some cases, identifying the sensor data further includes measuring, by at least one additional sensor, one or more metrics among a temperature, a movement, a voltage, a current, or a capacitance associated with the cell, wherein the sensor data indicates the one or more metrics. According to some examples, the failure event is predicted by a neural network. For example, the sensor data may be first sensor data, the cell may be a first cell, the failure event may be a first failure event, and the method can further include identifying second sensor data of a second cell, the second sensor data being obtained during at least one second failure event of the second cell; and training the neural network based on the second sensor data and an indication of the at least one second failure event. In various examples, the failure event includes thermal runaway. In some instances, activating the control circuit includes causing the control circuit to modify a current flowing through the cell. In some cases, activating the control circuit includes causing the control circuit to disconnect the cell from one or more additional cells in the battery system.

An example system includes at least one processor; and memory storing instructions that, when executed by the at least processor, cause the at least processor to perform operations including: identifying sensor data of a cell in a battery system; predicting, based on the sensor data, a failure event of the cell; and preventing the failure event by activating a control circuit connected to the cell. According to some examples, identifying the sensor data includes identifying at least a portion of the sensor data measured by a pressure sensor, the portion indicating a pressure associated with the cell. For instance, the portion may be a first portion, and identifying the sensor data can further include identifying at least a second portion of the sensor data measured by at least one additional sensor, the second portion indicating one or more metrics among a temperature, a movement, a voltage, a current, or a capacitance associated with the cell, wherein the sensor data indicates the one or more metrics. According to some examples, the memory further stores a neural network, and the failure event is predicted by the neural network. In some cases, the sensor data is first sensor data, the cell is a first cell, and the failure event is a first failure event, wherein the operations further include identifying second sensor data of a second cell, the second sensor data being obtained during at least one second failure event of the second cell, and training the neural network based on the second sensor data and an indication of the at least one second failure event. According to some instances, the failure event includes thermal runaway. In some cases, activating the control circuit includes causing the control circuit to modify a current flowing through the cell. In some cases, activating the control circuit includes causing the control circuit to disconnect the cell from one or more additional cells in the battery system.

An example Smart Battery Management System (SBMS) includes sensors configured to measure one or more metrics of a plurality of cells in a battery system; control circuits electrically connected to the plurality of cells in the battery system; at least one processor; and memory storing instructions that, when executed by the at least one processor, cause the at least one processor to perform operations including identifying sensor data measured by at least one first sensor among the sensors, the sensor data indicating the one or more metrics of first cell among the plurality of cells in the battery system; predicting, by inputting the sensor data into a trained neural network, a failure event of the first cell; and preventing the failure event by causing a first control circuit among the control circuits to disconnect the first cell from one or more second cells among the plurality of cells in the battery system. In some cases, the metrics include at least one of a pressure, a temperature, a movement, a voltage, a current, or a capacitance associated with the cell. According to some examples, the failure event includes thermal runaway of the cell. In various instances, the battery system is powering a vehicle.

DESCRIPTION OF THE FIGURES

The following figures, which form a part of this disclosure, are illustrative of described technology and are not meant to limit the scope of the claims in any manner.

DETAILED DESCRIPTION

Figure 1:
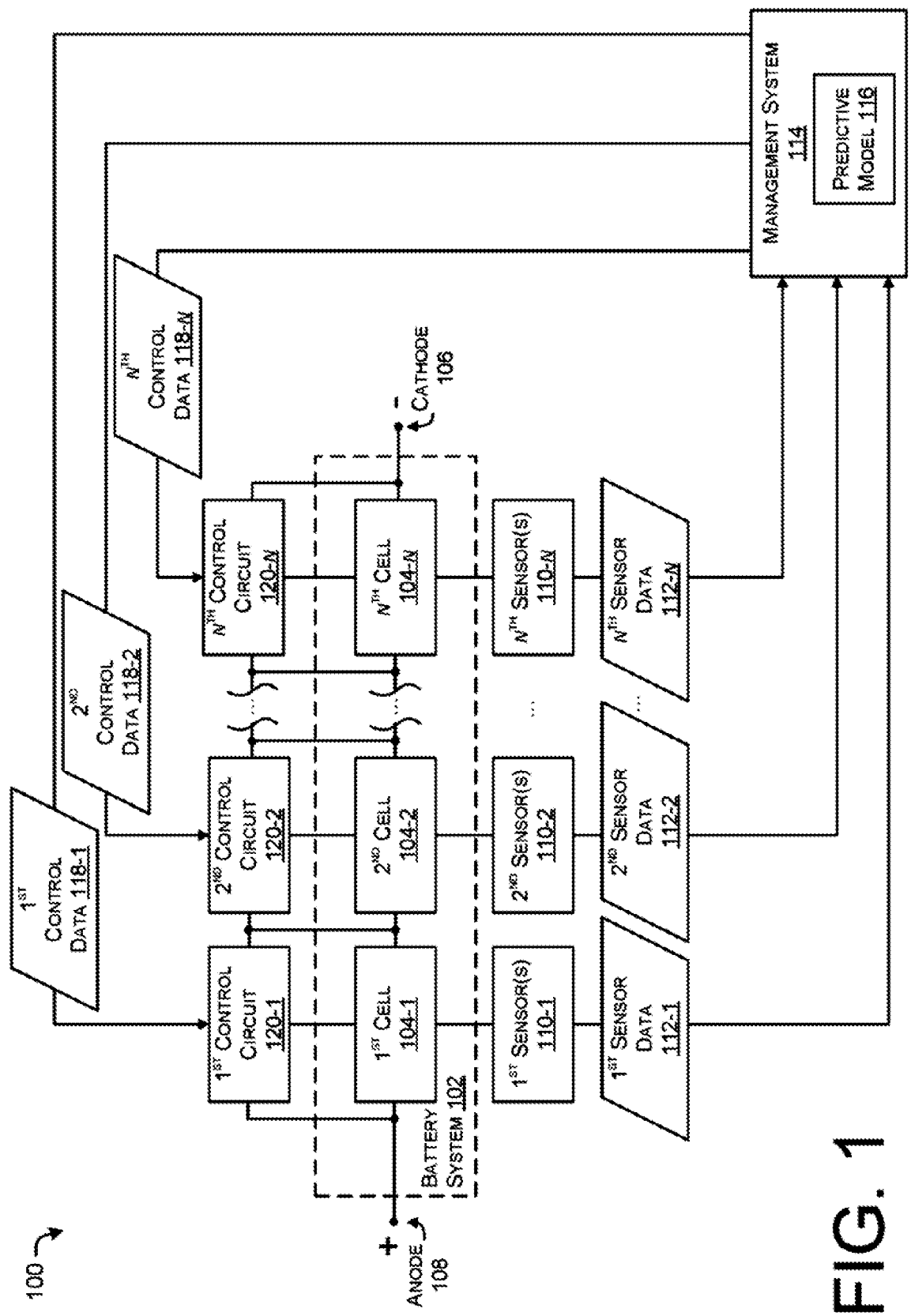
FIG. 1 shows an example environment utilizing a Smart Battery Management System (SBMS).

Various implementations of the present disclosure will be described in detail with reference to the drawings, wherein like reference numerals present like parts and assemblies throughout the several views. Additionally, any samples set forth in this specification are not intended to be limiting and merely set forth some of the many possible implementations.

Throughout this description, some aspects are described in terms that would ordinarily be implemented as software programs. Those skilled in the art will readily recognize that the equivalent of such software can also be constructed in hardware, firmware, or micro-code. The present description is directed in particular to algorithms and systems forming part of, or cooperating more directly with, systems and methods described herein. Aspects not specifically shown or described herein of such algorithms and systems, and hardware or software for producing and otherwise processing signals or data involved therewith, can be selected from systems, algorithms, components, and elements known in the art. Given the systems and methods as described herein, software not specifically shown, suggested, or described herein that is useful for implementation of any aspect is conventional and within the ordinary skill in such arts.

Lithium ion cells, and other types of electrochemical cells, are subject to events like thermal runaway during their operational lifetime. Thermal runaway can lead to fires and explosions, which can result in severe equipment damage and personal injury. Thermal runaway can, at the very least, leave long lasting damage to a cells which may decrease its quality and duration of use. Even when controlled at its early stages, thermal runaway can nevertheless permanently damage cells. Some prior schemes use battery management systems (BMSs) as a last resort to address thermal runaway. Some prior schemes use specialized enclosures.

Batteries can include many different cells (e.g., hundreds to thousands of cells) in a parallel and/or series arrangement. For instance, a cell can include one electrochemical couple, such as a AAA, AA, C, D, 18650, or 22700 size cell. Some examples of batteries include a 12V car battery (including six cells), a 9V battery (including six cells), or a complex automotive battery (including over 4000 cells, for instance). Maintaining balance among the cells and preventing the onset of thermal runaway in any of the cells can be an important challenge for battery design, particularly in the automotive and defense industries.

As cells and batteries increase in energy density making them smaller and lighter, failures can result in catastrophic events. Such is the case with lithium-based cells and/or cells with electrochemistries where the highly reactive electrodes and volatile electrolyte contribute to thermal runaway and failure during its operational lifetime. Thermal runaway can lead to fires and explosions or deflagration if less than the speed of sound that can damage surrounding systems, personnel, and environment.

Failure appears to occur spontaneously without warning throughout the life of the battery during charge and discharge. However, dendritic growth on electrodes within individual cells, which is a main contributor to cell failure and thermal runaway, does not occur spontaneously, but gradually. Dendrites may grow faster at relatively cold temperatures (e.g., ambient temperatures of less than 0° C.). Dendritic growth happens during charging. The growth rate increases with the size of the dendrite. This phenomenon may be difficult to observe externally by measuring voltage and current exclusively. However, variations in certain electrical, thermal, and physical parameters can provide enough evidence to predict battery system and cell failure and remove battery system and cell from use before disaster occurs.

Some prior schemes include cells and/or batteries packaged with BMS modules, which may increase safety at the expense of power density. These BMS modules may take up a significant amount of space. Further, large-sized BMS modules be impractical in dynamic (e.g., moving) environments due to their mass. In some prior BMS schemes, it is difficult to determine the state of charge (SOC) of a Li-ion cell. Moreover, some prior BMSs don't consider dynamic operation. (e.g., dynamic mechanical loading of batteries in UAVs, cars, etc.).

Various implementations for the present disclosure can utilize a smart BMS (SBMS) to monitor and control battery systems. Some examples herein track cell parameters, detect significant changes in parameters, and in response, shut down cells or systems. Some examples shut down cells that exceed 120° F. For example, machine learning (ML) based on data from temperature sensors and pressure determination using a gauge (e.g., a high-temperature (~200° C.) strain gauge). As pressure increases, a cell can expand. The expansion of the cell may be measured in order to derive the pressure within the cell. In some cases, both pressure sensors (e.g., strain gauges) and temperature sensors (e.g., thermistors) can be used to monitor battery cells and/or systems.

Additionally or alternatively, implementations can utilize non-contact pressure sensors, or other types of sensors. Some examples of SBMS modules can be retrofit to existing battery systems.

According to some implementations, a battery can include multiple cells arranged in a honey-comb fixture. This arrangement and fixture can prevent cell-to-cell thermal propagation. Thus, if one cell experiences thermal runaway, other cells within the battery can be protected from damage. The fixture can further serve as a heat sink, which may dissipate heat from individual cells. The fixture can also provide mechanical support to the cells, which can prevent side-wall breaches in the event of cell failure.

In some examples, an ML approach can be used to predict and preemptively stop possible modes of failure in order to limit damage to cells and/or batteries and provide a reliable estimation of State of Health (SoH). The algorithm can be implemented in a data module that interfaces externally to a battery management system, in some cases. In some cases, a battery health indicator can be generated. Some examples include a management system that can (a) include a machine learning algorithm that learns from existing cell failure events to preempt future failure; (b) isolate and bypass the modules that are about to fail; or (c) take into account cell and/or battery health as with reduced health comes higher probability of failure. Some example SBMSs can include at least one of: (d) an external sensor interface to existing cells and/or battery packs in industry; (e) change in existing BMS for predicting earlier detection of battery failure; or (f) onboard management of batteries for optimal power in critical situations. Some examples attach to a cell and/or battery system so do not require special enclosures that reduce energy density. Some examples include a software and sensing package.

An example SBMS (also referred to as a Predictive Monitoring System (PMS)) can use an ML approach validated by experimental analysis to substantially prevent catastrophic failure of primary and secondary lithium-based batteries and other battery electrochemistries as well as accurate real-time estimation of SoH. The SBMS, can use analysis and control algorithms running on a microprocessor or other control unit to control (e.g., turn off or disconnect) damaged or problematic cells based on current and historical measurements from individual cell voltage, current, temperature, and strain gauge measurements. Rate and magnitude of sensor and electrical measurement changes can be continually assessed by the algorithm using historical information. If algorithm predicts unsafe operation or thermal runaway, a command can be sent to energize or de-energize relay(s) and remove unsafe cell or battery(s) from the system. The SMBS can be used as add-on to existing battery monitoring systems or can be integrated into new battery designs. The SMBS can be equipped with individual- or multiple-cell monitoring for temperature, pressure, voltage, current, and various other metrics. The SBMS can take power from a facility or from the battery being managed. In some cases, the SBMS can include cut-off relays and/or can include an indicator displaying battery and SBMS status. SMBS can be programmed and controlled internally or externally by a computer (e.g., via RS 232 or USB connections).

Prior battery management systems or battery monitoring systems do not incorporate predictive learning, pressure sensing, simultaneous temperature and pressure sensing, have no basis for internal temperature correlated to external temperature, nor are prior systems capable of predicting failure events with temperature and pressure measurements.

FIG. 1 shows an example environment 100 utilizing a Smart Battery Management System (SBMS). As shown, the environment 100 includes a battery system 102, which includes first through nth cells 104-1 to 104-n. The first through nth cells 104-1 to 104-n may be connected to each other in series, in parallel, or a combination thereof. According to various examples, the first through nth cells 104-1 to 104-n may be electrochemical cells. In some cases, the first through nth cells 104-1 to 104-n can be rechargeable.

The battery system 102, as a whole, can be configured to generate a voltage between a cathode 106 and an anode 108. In some cases, the battery system 102 may be connected to an electrical circuit that is powered by the voltage. For example, the battery system 102 may be connected to and may power a vehicle engine. For instance, the vehicle engine may be configured to turn wheels of an automobile, propellers of a submarine, a UAV, or the like. In some cases, the battery system 102 may be part of a microgrid.

The first to nth cells 104-1 to 104-n can be monitored, respectively, by first to nth sensors 110-1 to 110-n. Each one of the first to nth cells 104-1 to 104-n may be monitored by one or more of the sensors 110-1 to 110-n. For example, the first cell 104-1 may be monitored by one or more first sensors 110-1, the second cell 104-2 may be monitored by one or more second sensors 110-2, and so forth. Any of the first to nth sensors 110-1 to 110-n may be powered by the first to nth cells 104-1 to 104-n, another power source connected to the first to nth sensors 110-1 to 110-n (e.g., at least one external battery), or a combination thereof. In some cases, the first to nth sensors 110-1 to 110-n include an energy harvester system that is configured to produce enough power to operate the first to nth sensors 110-1 to 110-n. The energy harvester may be a solar cell, a wireless charge device, or the like. For example, the first to nth sensors 104-1 to 104-n may include a Michigan Micro Mote (M3), The first to nth sensors 110-1 to 110-n may be configured to measure at least one metric associated with the first to nth cells 104-1 to 104-n. The metric(s) can include, for instance, at least one of temperature, pressure, movement (e.g., acceleration), current, voltage, impedance, or capacitance.

In some cases, the first to nth sensors 110-1 to 110-n may include at least one temperature sensor configured to measure a temperature of at least one of the cells 104-1 to 104-n. Temperature can be measured from a thermistor (or some other type of resistance-based temperature detector), a thermocouple, or other sensor. In some cases, thermistors can be more accurate or have a quicker response time than thermocouples, for instance. Mounting locations of the temperature sensors can depends on the shape of the cells 104-1 to 104-n (e.g., cylindrical or prismatic). In some cells, side locations provide the best measurements while in others, temperature sensors can be located on or within a predetermined distance of electrode locations within the cells 104-1 to 104-n, since electrodes can have a higher thermal conductivity than porous electrode materials, electrolytes, and other materials within the cells 104-1 to 104-n. Because detection of temperature changes inside cells can be relatively slow, pressure changes can be detected much quicker than temperature changes.

In some examples, the first to nth sensors 110-1 to 110-n may include at least one pressure sensor configured to measure a pressure of at least one of the cells 104-1 to 104-n. For instance, two-dimensional strain-gauges mounted on cell 104-1 to 104-n cases can be used to detect sudden pressure changes indicative of shorting, electrolyte bubbling, and flash vapor events of electrolyte or electrode material. Slight deformations in the case due to pressure can change the resistance of the 2-D strain gauge in both directions. The case deformation versus pressure can be calibrated ahead of time and adjusted for the resistance of the case from positive to negative terminal on a sample cell or from the length of the widest side of each cell 104-1 to 104-$n$ with terminals located on one side. Resistance of the cell case to deformation can be related to the case thickness and material density, similar to sheet resistance. Custom battery system designs may require additional case expansion versus pressure experiments during system validation. Pressure profiles can be stored in a microprocessor for use by the management system 114. Thermal and pressure signatures from the cells 104-1 to 104-$n$ and the battery system undergoing catastrophic failure can be stored and used by the management system 114 to predict failure events and command system shutdown. Cell pressure can be measured by a 2-D strain gauge mounted on the side or top of a given cell 104-1 to 104-$n$. Pressure can be calibrated based on resistance of a cell case between longest length of side where strain-gauge is mounted, i.e. between positive and negative end of an 18650 cell. Pressure measurements can detect sudden evolution of bubble formation or vaporized electrolyte within a given cell.

According to various instances, the first to nth sensors 110-1 to 110-$n$ may include at least one movement sensor configured to measure a movement (e.g., an acceleration) of at least one of the cells 104-1 to 104-$n$. In some cases, the first to nth sensors 110-1 to 110-$n$ may include at least one current sensor configured to measure an electrical current through at least one of the cells 104-1 to 104-$n$. In various examples, the first to nth sensors 110-1 to 110-$n$ may include at least one voltage sensor configured to measure an electrical voltage across at least one of the cells 104-1 to 104-$n$.

According to some cases, the first to nth sensors 110-1 to 110-$n$ may include at least one impedance (e.g., capacitance) sensor configured to measure an electrical capacitance of at least one of the cells 104-1 to 104-$n$. In various examples, the impedance sensor can measure battery system 102 and/or cell 104-1 to 104-$n$ impedance by injecting a low-amplitude (e.g., an amplitude corresponding to a maximum voltage between 5 and 100 mV) alternating current (AC) signal with a frequency ranging from 1 kHz to 10 MHz. In various cases, a capacitance sensor can inject low-level pulses to evaluate capacitance of the battery system 102 and/or cells 104-1 to 104-$n$, and can use transmission line methods to determine potential loss of conductivity in the battery system 102. The impedance sensor may include a signal generator that can apply a low-level AC signal and/or a direct current (DC) pulse to at least one of the cells 104-1 to 104-$n$, in order to identify cell impedance and/or capacitance. The impedance and/or capacitance measurements can be used to identify dendrite growth, electrolyte leaks, or the like. For instance, lead-acid batteries can be attested by applying ~100 mV AC at a given frequency. Some examples herein use <100 mV AC, e.g., 10 mV AC. Some examples herein apply a DC pulse and measure how quickly a voltage of a corresponding cell 104-1 to 104-$n$ recovers. Internal resistive, transport losses indicate separator and properties of the cells 104-1 to 104-$n$ that may be relevant to failure prediction.

The first to nth sensors 110-1 to 110-$n$ may be configured to generate first to nth sensor data 112-1 to 112-$n$, respectively. The sensor data 112-1 to 112-$n$ may indicate the metric(s) of the cells 104-1 to 104-$n$, which were measured by the first to nth sensors 110-1 to 110-$n$. In some cases, the first to nth sensor data 112-1 to 112-$n$ may include digital data, which may have been converted from analog data via one or more analog to digital converters within the first to nth sensors 110-1 to 110-$n$. The first to nth sensor data 112-1 to 112-$n$ may include one or more data packets (e.g., Internet Protocol (IP) data packets, or the like), which may contain indications of the metric(s) within payloads of the data packet(s). In some cases, the first to nth sensor data 112-1 to 112-$n$ may be generated periodically, and may be based on periodic measurements of the metric(s) by the cells 104-1 to 104-$n$. For example, the first to nth sensor data 112-1 to 112-$n$ may indicate measurements performed every second, every minute, every hour, every day, or according to some other periodic schedule. In some cases, the first to nth sensors 110-1 to 110-$n$ may be configured to collect data from only a subset of the cells 104-1 to 104-$n$, such as a subset of critical cells and/or cells within critical locations in the battery system 102.

In some examples, the sensors 110-1 to 110-$n$ can include contact (e.g., strain gauge pressure sensors) and non-contact (e.g., eddy current probe sensors) devices for strain measurement can be added. In some examples, at least some of the sensors 110-1 to 110-$n$ can be added to the battery system 102 after manufacture of the battery system 102. The level of access to the battery system 102 may depend on the level of control of the SBMS system in the environment 100. For instance, the system may have a relatively high level of control in implementations in which the individual cells 104-1 to 104-$n$ can be monitored and/or controlled. However, the system may have a relatively low level of control in implementations in which only a subset of the cells 104-1 to 104-$n$ are monitored and/or controlled, or the cells 104-1 to 104-$n$ are monitored and/or controlled at the battery system 102 level, rather than individually. In some cases, the system may have a relatively high level of control in implementations in which the sensors 110-1 to 110-$n$ measure a large number of different metrics, whereas the system may have a relatively low level of control in implementations in which the sensors 110-1 to 110-$n$ measure a small number of different metrics. Given the critical cells (locations) in the pack, these related cells can have higher level of control compared with rest part of the pack (e.g., critical cells have one sensor per cell, other cells controlled at sub-pack level). Some examples calibrate measurements by the sensors 110-1 to 110-$n$ with respect to one or more reference batteries.

The first to nth sensors 110-1 to 110-$n$ may output the first to nth sensor data 112-1 to 112-$n$ to a management system 114. In various examples, the management system 114 may be embodied and/or implemented by a computing system. In some cases, the management system 114 may be executed by a computing system that is physically located in proximity to the battery system 102 or may be located remotely from the battery system 102. The first to nth sensor data 112-1 to 112-$n$ may be transmitted over one or more interfaces connecting the first to nth sensors 110-1 to 110-$n$ to the management system 114. The interface(s) may include at least one wired interface, at least one wireless interface (e.g., Bluetooth, WiFi, 3GPP, or some other type of wireless interface), or a combination thereof.

The management system 114 may be configured to analyze the first to nth sensor data 112-1 to 112-$n$. According to various implementations, the management system 114 may analyze the measured metric(s) indicated in the first to nth sensor data 112-1 to 112-$n$ in order to detect whether any of the cells 114-1 to 114-$n$ are in danger of undergoing a failure event. For example, the management system 114 may compare the first to nth sensor data 112-1 to 112-$n$ to sensor data obtained from at least one other cell before and while the other cell(s) underwent a failure event. An example of a failure event includes, for instance, thermal runaway, which may cause an explosion and/or some other type of physical breakdown of a given cell. Another example of a failure event includes significant dendritic growth within an electrochemical cell, which can interfere with the operation of the cell.

In some implementations, the management system 114 may include a predictive model 116, which can be used to analyze the first to nth sensor data 112-1 to 112-$n$. In some cases, the management system 114 and/or the predictive model 116 may be a data module that is external to an existing BMS that includes the sensors 110-1 to 110-$n$. The management system 114 and/or the predictive model 116 may be configured to learn conditions from previously performed battery failure experiments in order to identify and preempt failure events of the battery system 102.

The predictive model 116 may be a Neural Network (NN). In some cases, the NN may be associated with a unidirectional dataflow. For example, the predictive model 116 may include a Deep Neural Network (DNN), such as a Convolutional Neural Network (CNN). The predictive model 116 may include a computer-based model that includes multiple "layers" or "blocks." At least one of the layers may be configured to perform an operation (e.g., a convolution and/or cross-correlation operation) on an input to the layer(s) and a "mask" or "filter" associated with the layer(s). The mask may be defined according to one or more numerical parameters. During a training phase, the parameter(s) of each layer in the management system 114 may be optimized to produce sample outputs from sample inputs. The sample inputs and outputs may be referred to as "training data."

According to some implementations, the training data may be generated based on an emulated battery system and/or battery cell. Generating the training data with the emulated battery system and/or battery cell may reduce or eliminate the need for destroying real-world battery systems and/or battery cells in order to train the predictive model 116.

In various examples, the predictive model 116 may be trained to predict failure events based on the first to nth sensor data 112-1 to 112-$n$. For instance, the training data may be generated by monitoring metric(s) of one or more cells outside of the cells 104-1 to 104-$n$. The training data may be obtained based on sensors monitoring the metric(s) of the outside cell(s) while the cell(s) undergo failure events. For example, the training data may indicate the metric(s) as the outside cell(s) undergo thermal runaway, dendrite growth, or other types of catastrophic failures. Accordingly, by optimizing the parameters of the predictive model 116, the management system 114 may learn to identify various trends within the metric(s) that are indicative of failure events before they occur. The management system 114 may therefore be enabled to predict new failure events by monitoring the cells 104-1 to 104-$n$ based on the sensor data 106-1 to 106-$n$. The sensor data 106-1 to 106-$n$ may include at least one input of the predictive model 116, and an indication of whether a failure event is predicted in any of the cells 104-1 to 104-$n$ can be at least one output of the predictive model 116.

The training and identifying phases of the predictive model 116 can be referred to as "attack" and "defense" steps, respectively. For the "attack" step, different imposed conditions are considered for a battery subject to thermal runaway, external puncture, etc. Individual cell parameters such as voltage, current, internal impedance, capacitance, temperature and pressure are monitored during the testing of these attack cases. An ML model can then be trained as part of the "defense" portion of the solution, learning the behavior of these parameters when the battery is in distress. The defense step is then used to predict when conditions similar to the attack cases will occur and can work as part of a greater SBMS to preemptively limit damage to a battery and prevent catastrophic failure. With this approach, real time monitoring of the battery system 102 can improve the ability of the management system 114 and/or the predictive model 116 to predict catastrophic events before they can happen.

In various examples, the management system 114 may be configured to predict a failure event in any of the cells 104-1 to 104-$n$. For instance, cell/battery specifications can be input into the management system 114 and stored for characterizing the initial SoH of a given cell. The specifications may include cell type (chemistry), size & shape, rated capacity, pressure relief valve rating, safety electronics, date of manufacture, quantity, parallel/series arrangement, packaging, and the like. In various cases, 2-3 full charge/discharge (100% depth of discharge) cycles may be performed on the cell (cell or arrangement of cells) to determine present capacity (Ampere-hours), coulomb quantities delivered and put back in, temperature correlations to voltage and current, cell pressure sensor value, current and voltage profiles to arrive at SoH and SoC scale and range. A low amplitude voltage AC signal may be injected into the circuit to measure present impedance (resistance and reactance) for each cell 104-1 to 104-$n$ and/or the battery system 102. As the battery system 102 is used to provide power to an external system, freshly acquired data can be compared by the management system 114 with previous data to identify anomalous behavior in a correlated value comprising each cell temperature, pressure, voltage, and current's max/min levels, rate, response to frequency pulses to relate cell impedance, and the like. A response patterns of at least one of the cells 104-1 to 104-$n$ that falls outside a confidence interval of normal operation can trigger an alert in the management system 114. In some cases, the management system 114 can output the alert to an operator, such that the operator can check the condition to determine if the anomaly was real or just an outlier. If operation continues, the response patterns can be observed again and alerted for out of tolerance conditions.

In some cases, the predictive model 116 includes multiple trained DNNs, wherein a single DNN corresponds to the battery system 102 and at least one of the cells 104-1 to 104-$n$ within the battery system 102. In some cases, other DNNs correspond to other battery systems. The battery system 102 can include a wide range of the cells 104-1 to 104-$n$ (e.g., 4 to >4000 cells).

Example inputs of an example DNN include cell type (chemistry), size & shape, rated capacity, date of manufacture, quantity, parallel/series arrangement, and packaging. Measurement inputs can include cycle number, depth of discharge, coulomb counts, voltage, current, temperature (cell and ambient), pressure and impedance instantaneous values and rates for the cycle.

Example outputs of an example DNN can include max/min/nom voltage, current, pressure, temperature, impedance, SoH, SoC, suspect cells/modules and estimate duration before failure. Some examples use current and historical measurements from voltage, current, temperature, and strain-gauge sensors in determining risk of failure. In some cases, current and historical values within the sensor data 112-1 to 112-$n$ can be used to determine the risk of failure and/or SoH. Initially, inputs can be used to characterize the battery system 102 being managed/monitored, such as cell geometry (e.g., size and/or shape), cell capacity in milli-ampere-hour, cell manufacture date, and brand/chemistry. As battery performs, individual electrical and sensor values will be used as feedback into the algorithm in detecting suspect cells and be used to determine present status of the battery system 102.

In various examples, the algorithm can output battery system 102 and cell 104-1 to 104-n status, e.g., individual cell voltage (current, average and deviation), string/pack voltage, cell and pack current, cell state of charge (SoC), charge/discharge cycles, current and average depth of discharge (DoD). In some cases, values can be viewed by toggling a display. In cases where extreme variations are sensed in any of the parameters, the management system 114 may disconnect or shut down the entire battery system 102. SoC determination of the cells 104-1 to 104-n can aid in improving battery system 102 performance, reliability, and cycle-life or lifetime.

According to some examples, the management system 114 may be configured to identify a State of Health (SoH) of each of the cells 104-1 to 104-n based on the sensor data 112-1 to 112-n. The value of SoH may be defined as a percentage, wherein 100% indicates full health of a given cell 104-1 to 104-n and 0% indicates the end of the lifetime of the cell 104-1 to 104-n. In some cases, the lifetime of the cell 104-1 to 104-n can expire when a capacitance of the cell falls below a particular threshold (e.g., 80% of its original capacitance at full health, wherein full health can be defined as the state of the cell with its maximum capacitance over its lifetime). The capacitance threshold can be defined according to the type of cell 104-1 to 104-n and/or an application for the cell 104-1 to 104-n. For example, a battery system 102 used to power a highly sensitive application (e.g., equipment in space) may reach the end of its life at a higher capacitance percentage threshold than a cell used to power a conventional automobile that operates in an environment with ample opportunities for replacement and repair. In some cases, the predictive model 116 may be trained to identify the SoH of each of the cells 104-1 to 104-n based on the sensor data 112-1 to 112-n.

Various examples include determining SoH by collecting capacity, cycling efficiency, internal resistance, etc. of example cells and comparing those metrics with labeled value (uncycled cell as 100%). A 50% state of health means that the battery system 102 and/or cell 104-1 to 104-n parameters have deviated significantly from at least one baseline and that its performance is no longer reliable. Cells 104-1 to 104-n with high SoH maintain most of the labeled capacity, have high cycling efficiency and low internal resistance. Generally, SoH will keep decreasing over the whole life span of the battery system 102. The management system 114 may determine SoH is based on the cell 104-1 to 104-n capacity, as well as cycling efficiency, internal resistance, and the like. In various examples, SoH can be defined as a customized variable for battery system 102 evaluation and the weight of individual component needs to be determined over cycling and observed failure.

The management system 114 can use the SoH to determine whether to target a cell among the cells 104-1 to 104-n for shutoff. For example, SoH may be an input into the predictive model 116. SoH represents the condition of a battery (in percent) in comparison to its ideal conditions. The battery system 102 and/or cells 104-1 to 104-n will have a SoH of 100% at the time of manufacture, which decreases over operating life by degradation and shelf life by self-discharge losses. Real time reading of the aforementioned battery parameters as well as data provided from the predictive model 116 can therefore also allow for an accurate measure of the SoH. This SoH can easily be used to quantify the value of the battery system 102 and/or cells 104-1 to 104-n overtime.

In various examples, the management system 114 can use voltage, current, temperature and strain-gauge resistance measurements to determine battery system SoH as well as whether the battery system should be disconnected. Various examples determine SoH based on deviation from rated capacity from coulomb counts (time to charge/discharge), ambient temperature, cycles completed, cell impedance, pressure, and the like. An SoH of 50% can mean that half of the cell life is done; such that approximately only 50% of available life is left. Depending on the use, it could mean that only so much time is left before the cells 104-1 to 104-n become metastable and could fail, or that 50% of available capacity is left; 50% are unrecoverable. Typical systems can be replaced when SoH falls below 80% based on the second case of SoH use. In cases where replacement cannot be achieved, operation can be adjusted to compensate for loss of energy. In various examples, the management system 114 can estimate mean time between failure (MTBF) (average time when a new battery/cell will experience failure (rupture, loss of voltage, short, etc.) based at least in part on SoH. SoH can be correlated with battery reliability or survivability, in some examples.

In some examples, SoH is proportional to amount of capacity remaining, with corrections from the gradients of monitored values during charge and discharge. For example, a cell phone battery can be 3800 mAh and may last 2 days. If it only lasts half a day with typical usage, then only 950 mAh remains and user will most likely get another battery or replace the phone as is becoming prominent. In some examples, the information used to predict SoH can be used to develop a basis for establishing thresholds and alarm conditions for the battery system 102. For example, the SoH values can be held in history while continuously updating the algorithm to detect faulty or suspect cells 104-1 to 104-n.

In various examples, the predictive model 116 can be further trained to identify trends in the operation of the battery system 102 by utilizing at least some of the sensor data 112-1 to 112-n as ongoing training data. The ongoing training of the predictive model 116, utilizing the sensor data 112-1 to 112-n, may enable the predictive model 116 to identify trends specific to the battery system 102 and/or the use of the battery system 102 during operation.

According to some examples, ongoing training can be used to adapt the predictive model 116 to a particular type of operation of the battery system 102 (e.g., to a specific operator). Since the predictive model 116 adapts to specific input, the retraining can be performed automatically based on the sensor data 112-1 to 112-n. The ongoing training can be non-linear. For instance, if the battery system 102 is used to power an electric vehicle with an aggressive driver, and the battery system 102 is operating in ambient conditions, the conditions that trigger failure events may be different than if the battery system 102 is used to power an electric vehicle with a passive driver, and the battery system 102 is operating in hot conditions. In some examples, the battery system 102 may power a personal vehicle that is used for a particular application (e.g., commuting, recreational driving, highway versus city driving, etc.), may be associated with regenerative braking, may be driven around a particular location with a particular terrain (e.g., mountainous versus flat terrain) and a particular ambient weather (e.g., hot arid climate versus cold icy climate, etc.). In some cases, the battery system 202 may be used to charge a microgrid, which may charge at varied rates during day or in windy conditions. In some cases, the battery system 202 may be always on and fully charged unless an emergency occurs. In some cases, the battery system 202 can be used for a military vehicle, which may be monitored for a higher minimum SoH (e.g., 90% rather than 80%), in some examples. The ongoing training allows the predictive model 116 to adjust its analysis through adaptive machine learning. Some examples are used with a brand new battery system 102, since it may be assumed that no degradation has occurred.

Given the capabilities of the predictive model 116, and the improved prediction accuracy provided by ongoing training, the predictive model 116 can identify how to control the cells 104-1 to 104-$n$ in order to minimize failure and maximize SoH. In some cases, the predictive model 116 can identify how to control the power draw from the cells 104-1 to 104-$n$ in the battery system 102 in order to run the cells 104-1 to 104-$n$ as efficiently and safely as possible. Various examples are in which the cells 104-1 to 104-$n$ and/or the battery system 102 are newly operational, the predictive model 116 can be trained based on standardized cells outside of the cells 104-1 to 104-$n$. However, as the cells 104-1 to 104-$n$ and/or the battery system 102 are operated, the predictive model 116 can be trained based on the sensor data 112-1 to 112-$n$ during operation of the battery system 102.

Although not illustrated in FIG. 1, the management system 114 may be embodied in a mobile device (e.g., a smartphone, tablet, or some other type of mobile device), or may be in communication with a mobile device. The management system 114 may cause the mobile device to output, in some cases, indications of the SoH or other metrics associated with the cells 104-1 to 104-$n$. In some cases, the metrics may be output via a user interface associated with the mobile device. Thus, a user can independently assess the performance and/or health of the battery system 102 during operation.

In various implementations, the management system 114 may generate first to nth control data 118-1 to 118-$n$ based on the first to nth sensor data 112-1 to 112-$n$. The first to nth control data 118-1 to 118-$n$ may be used to control first to nth control circuits 120-1 to 120-$n$, respectively. The first to nth control circuits 120-1 to 120-$n$ may be coupled, respectively, to the first to nth cells 104-1 to 104-$n$. In some cases, the first to nth control data 118-1 to 118-$n$ may include digital data. The digital data may be converted into analog control signals by one or more digital to analog converters at the control circuits 120-1 to 120-$n$. The first to nth control data 118-1 to 118-$n$ may include one or more data packets (e.g., IP data packets, or the like), which may contain indications of instructions to the control circuits 120-1 to 120-$n$ within payloads of the data packet(s). The first to nth control data 118-1 to 118-$n$ may be transmitted from the management system 114 to the control circuits 120-1 to 120-$n$ over at least one wired interface, at least one wireless interface, or a combination thereof.

In various cases, the first to nth control circuits 120-1 to 120-$n$ may be configured to adjust electrical circuits associated with the cells 104-1 to 104-$n$ based on the first to nth control data 118-1 to 118-$n$. In some cases, at least one of the first to nth control circuits 120-1 to 120-$n$ may be configured to disconnect (e.g., shunt) at least one of the cells 104-1 to 104-$n$ based on the control data 118-1 to 118-$n$. According to some example, at least one of the first to nth control circuits 120-1 to 120-$n$ may include a high-power metal-oxide-semiconductor field-effect transistor (MOSFET) that can be used to bypass one or more problematic cells among the cells 104-1 to 104-$n$. For example, the management system 114 may determine that the first cell 104-1 is in danger of exploding due to thermal runaway based on the first sensor data 112-1, and upon making that determination, the management system 114 may generate the first control data 118-1 in such a way that causes the first control circuit 120-1 to disconnect the first cell 104-1 from the battery system before the first cell 104-1 explodes. Accordingly, the management system 114 can isolate and bypass problematic cells among the cells 104-1 to 104-$n$ within the battery system 102.

Some examples of the control circuits 120-1 to 120-$n$ include relays and MOSFETs for use in isolating individual cells 104-1 to 104-$n$. Some examples of the control circuits 120-1 to 120-$n$ include thyristors that are configured to block current through the cells 104-1 to 104-$n$ as a preventive measure in case the sensors 106-1 to 106-$n$ and/or the management system 114 do not detect upcoming failure. A cell 104-1 to 104-$n$ can be isolated by the control circuits 120-1 to 120-$n$ based on the control data 118-1 to 118-$n$, which can be generated based on historical and present operating performance and measurements indicated in the sensor data 112-1 to 112-$n$. In some cases, the management system 114 and/or the control circuits 120-1 to 120-$n$ may be configured to prevent a failure condition by isolating cells 104-1 to 104-$n$ before a certain condition associated with the failure condition is exceeded, rather than after the condition is exceeded.

Some examples of the control circuits 120-1 to 120-$n$ include a bypass circuit topology to shunt the current across a bypass so current does not pass through a corresponding cell 104-1 to 104-$n$. Some examples use a shutoff circuit topology that removes the entire battery system 102 from an electrical circuit powered by the battery system 102. According to some examples, bypass relays in the control circuits 120-1 to 120-$n$ can be normally open (NO) and powered by the cells 104-1 to 104-$n$ themselves. A control circuit can be NO when it remains open without an input, or when the input corresponds to a base level (e.g., "0"), and when it closes in response to the input. In various cases, the power from the cells 104-1 to 104-$n$ to the relays can be controlled by the management system 114. The shutoff relay can be normally closed (NC) and powered by the battery system 102 but controlled by the management system 114. A control circuit can be NC when it remains closed without an input, or when the input corresponds to a base level (e.g., "0"), and when it opens in response to the input. By powering elements of the control circuits 120-1 to 120-$n$ using the cells 104-1 to 104-$n$, the cells 104-1 to 104-$n$ can remain controlled by the management system 114 even in the case of an external power outage. In some cases, bypass relays in the control circuits 120-1 to 120-$n$ can accompany each cell 104-1 to 104-$n$ due to packaging/construction constraints. In some examples, the entire battery system 102 has a single cutoff relay among the control circuits 120-1 to 120-$n$. In examples in which the battery system 102 is relatively large with many (e.g., over one hundred) cells 104-1 to 104-$n$ in series and/or parallel, additional cutoff relays may be included in the control circuits 120-1 to 120-$n$, such that the battery system 102 can be used as a power source even when one or more of the cells 104-1 to 104-$n$ are bypassed. In some examples, if only one of the cells 104-1 to 104-$n$ in a series is close to failure, the management system 114 can activate a bypass relay among the control circuits 120-1 to 120-$n$ to bypass the cell 104-1 to 104-$n$ without disconnecting the rest of the cells 104-1 to 104-$n$ in the series from the battery system 102.

Some examples of the control circuits 120-1 to 120-*n* include Halon fire extinguishers, which can be triggered to put out fires within the battery system 102, In some cases, the control circuits 120-1 to 120-*n* can include actuators that can be triggered to dump regular sand on the battery system 102 to suffocate reactions in the cells 104-1 to 104-*n* in the event of catastrophic failure.

In some cases, after shutting down at least one of the cells 104-1 to 104-*n*, the management system 114 can output a request for a physical inspection of the battery system 102 to a user. For instance, the request can be output on a User Interface (UI). The physical inspection can be requested for a particular cell 104-1 to 104-*n*, the battery system 102 itself, mounting, wiring, or obstructions associated with the battery system 102. In some cases, the management system 114 can record the sensor data 112-1 to 112-*n*, or analyzed data, to provide a fingerprint of a cell 104-1 to 104-*n* before shutdown and provide a historical view over time to see when the anomalous behavior started. In some cases, these results and findings can be recorded in system log for future use in estimating SoH and failure.

In some cases, at least one of the first to nth control circuits 120-1 to 120-*n* may be configured to load balance at least one of the cells 104-1 to 104-*n* within the battery system 102. In some cases, one or more of the first to nth control circuits 120-1 to 120-*n* may include at least one voltage and/or current source (e.g., a regulator). In some examples, the management system 114 may determine that the capacitance of the first cell 104-1 and the capacitance of the second cell 104-2 are unbalanced (or in danger of being unbalanced) based on the first sensor data 112-1 and the second sensor data 112-2, and upon making that determination, the management system 114 may generate the second control data 118-2 in such a way that causes the second control circuit 120-2 to generate a current through the second cell 104-2 that balances a load over the first cell 104-1 and the second cell 104-2.

In some implementations, at least one of the sensors 110-1 to 110-*n*, the management system 114, or the control circuits 120-1 to 120-*n* may be built into the battery system 102 or affixed to the battery system 102 after the battery system 102 is manufactured. In some examples, the sensors 110-1 to 110-*n* include strain gauges that are added to the cells 104-1 to 104-*n* and that are accessible on existing designs. In some battery systems 102, the cells 104-1 to 104-*n* are assembled and packaged in heat-shrink before arranging in the overall battery layout. This poses a problem for attaching some examples of the sensors 110-1 to 110-*n* and/or control circuits 120-1 to 120-*n*, such as temperature sensors, voltage and current monitors, and bypass relays to individual cells. In some of these examples, the battery system 102 as a whole can be monitored and controlled, rather than individual cells 104-1 to 104-*n*.

When at least one of the sensors 110-1 to 110-*n*, the management system 114, or the control circuits 120-1 to 120-*n* are built into the battery system 102, the placement of the sensors 110-1 to 110-*n* can be optimized to the battery system 102, which can be used obtain more effective monitoring, failure protection and safe operation.

Some examples provide improved control and safety assurance including sensors 110-1 to 110-*n* and control circuits 120-1 to 120-*n* for each one of the cells 104-1 to 104-*n*, to selectively bypass and/or remove problematic cells within the battery system 102. Control and monitoring fidelity can be lost when the battery system 102 is monitored as a whole instead of monitoring individual cells 104-1 to 104-*n*. In some examples, various measurements indicated in the sensor data 112-1 to 112-*n* can be calibrated with respect to a reference battery. Trends associated with the reference battery can be identified by running several charge/discharge cycles of the reference battery. The management system 114 can calibrate the measurements in the sensor data 112-1 to 112-*n* based on the output from the reference battery, the number of charge/discharge cycles performed by the battery system 102, and the capacity of the battery system 102. For instance, the number of charge/discharge cycles and the capacity of the battery system 102 can depend on an age of the cells 104-1 to 104-*n* and/or an average operational use of the cells 104-1 to 104-*n*.

According to various implementations, the management system 114 may be configured to prevent catastrophic failures in any of the first to nth cells 104-1 to 104-*n*. In addition, the management system 114 may be configured to load balance the battery system 102 during operation of the battery system 102.

The SBMS helps to make high energy dense battery systems safe and controllable. The probability of a high energy density battery system undergoing failure during its operating life can be high. Anywhere where high-energy dense batteries are used could benefit from the SBMS. Examples include high-energy density technologies (Li-ion, Na-ion, Li—S) or other systems with characteristics such as high reactivity of electrode and volatility of electrolyte.

Figure 2:
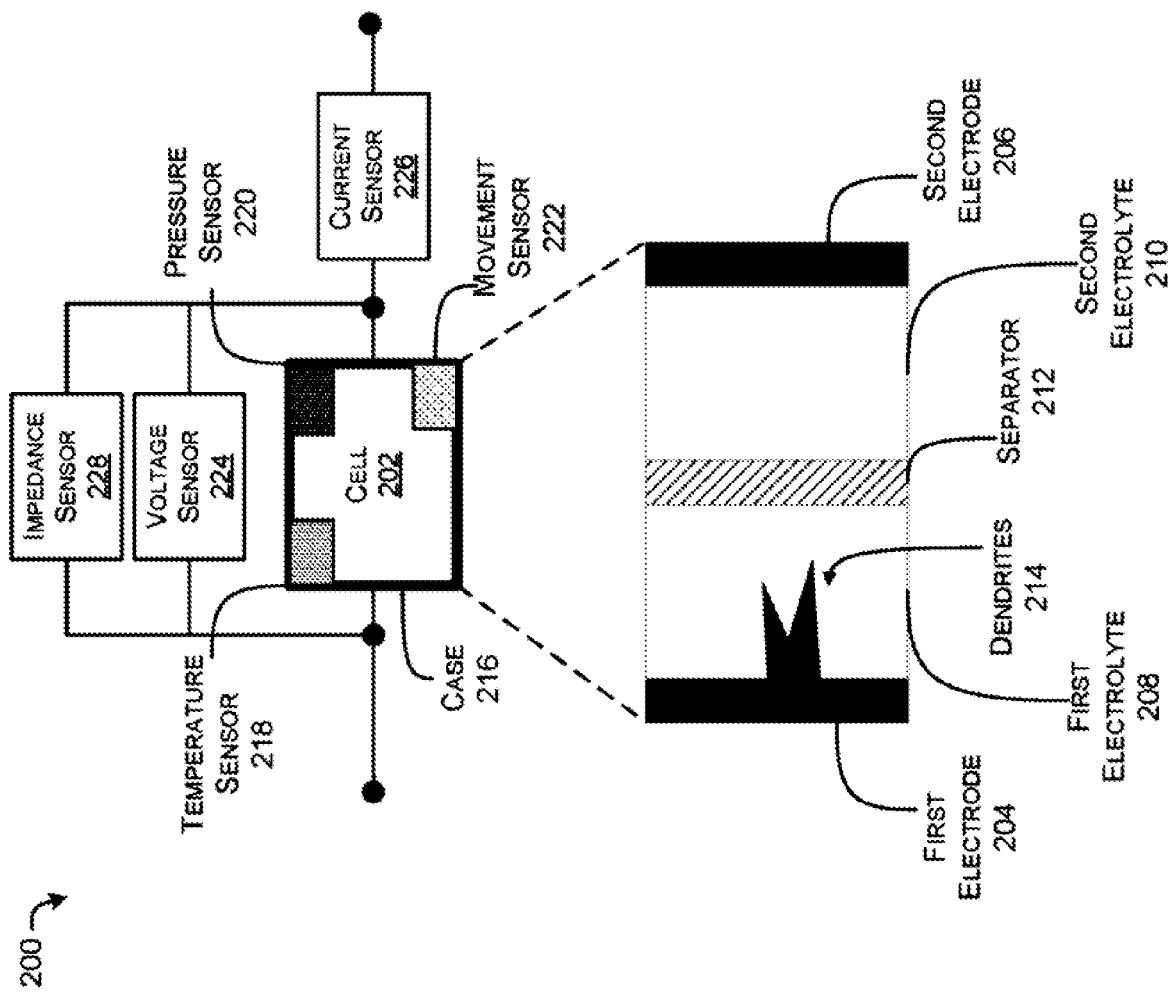
FIG. 2 illustrates an example cell circuit including a variety of sensors used to measure various metrics associated with a cell.

FIG. 2 illustrates an example cell circuit 200 including a variety of sensors used to measure various metrics associated with a cell 202. In various examples, the cell 202 can be any one of the first to nth cells 104-1 to 104-*n* described above with reference to FIG. 1.

The cell 202 may be an electrochemical cell. For example, the cell 202 may be a galvanic cell (also referred to as a "voltaic" cell). As illustrated in FIG. 2, the cell 202 may include a first electrode 204 and a second electrode 206. A first one of the first electrode 204 and the second electrode 206 may be a cathode, and a second one of the first electrode and the second electrode 206 may be an anode. In various examples, the first electrode 204 and/or the second electrode 206 may include a conductive material, such as a metal.

The first electrode 204 may be in contact with a first electrolyte 208 and the second electrode 206 may be in contact with a second electrolyte 210. The first electrode 204 and the first electrolyte 208 may comprise a first half-electrochemical cell. The second electrode 206 and the second electrolyte 210 may be a second half-electrochemical cell. The first electrolyte 208 may be a solution that includes cations of a material (e.g., a metal) in the first electrode 204 and anions to electrically balance out the charge of the cations. The second electrolyte 210 may be a solution that includes cations of a material (e.g., a metal) in the second electrode 206 and anions to electrically balance out the charge of the cations. In some cases, the first electrolyte 208 and/or the second electrolyte 210 may include a liquid and/or a gel (e.g., a polymer gel). In some examples, the first electrolyte 208 and/or the second electrolyte 210 may include a solid electrolyte, such as a ceramic-based electrolyte.

A separator 212 may be disposed between the first electrolyte 208 and the second electrolyte 210. In various examples, the separator 212 may block the flow of electrons within the cell 202 itself. However, the separator 212 may conduct the flow of cations through the cell 202. In some cases, the separator 212 may include a salt bridge.

The cell 202 may generate a voltage between the first electrode 204 and the second electrode 206 due to the performance of two redox half reactions in the first and second half-electrochemical cells. To simplify the following description, it will be assumed that the first electrode 204 is an anode and the second electrode 206 is a cathode. As the cell 202 is discharged, an oxidation reaction between the first electrode 204 and the first electrolyte 208 may occur. The oxidation reaction may generate negatively charged electrons as well as positively charged ions (cations) that comprise a material within the first electrode 204 (e.g., metal cations). The electrons may travel through a circuit toward the second electrode 206. In some cases, the cations may travel through the separator 212 to the second electrode 206. The combination of electrons and cations at the second electrode may generate a reduction reaction. Thus, the first and second electrolytes 208 and 210 as well as the separator 212 may conduct the cations through the cell 202, and the external circuit connecting the first and second electrodes 204 may conduct the electrons.

Eventually, the cell 202 may lose its ability to spontaneously generate voltage when the material within the first electrode 204 is depleted. In some implementations, the cell 202 may be a rechargeable cell. During a charging process, a reverse reaction can occur due to the application of external voltage to the cell 202. During charging, the electrons and cations may move from the second electrode 206 to the first electrode 204 due to the application of the external voltage.

In some particular examples, the cell 202 may be a lithium-ion cell. In these examples, the first electrode 204 and the second electrode 206 may include lithium atoms. The first electrode 204 may include carbon (e.g., graphite) and the second electrode 206 may include a lithium-containing material (e.g., lithium-doped cobalt oxide). Lithium ions may be transferred between the first electrode 204 and the second electrode 206 during charge and discharge. The electrolytes 208 and 210 may include a lithium salt (e.g., $LiPF_6$, $LiClO_4$, $LiBF_4$, or the like) and a solvent (e.g., an organic solvent, such as diethyl carbonate, dimethyl carbonate, ethylene carbonate, or the like).

During operation of the cell 202, dendrites 214 may spontaneously grow in the cell 202 during operation of the cell 202. The dendrites 214 may grow from the first electrode 204, in various examples. The dendrites 214 may have a tree-like structure with whisker-like projections that can grow during the lifetime of the cell 202. In implementations in which the cell 202 is a lithium-ion cell, the dendrites 214 may include lithium atoms.

The dendrites 214 may interfere with the operation of the cell 202. For example, the dendrites 212 may increase reactions between the first electrolyte 208 and the lithium within the dendrites 214, thereby producing unpredictable voltage output by the cell 202 during discharge. In some cases, the dendrites 214 may grow to such an extent that they may contact or pierce the separator 212. Thus, the dendrites 214 may cause a failure event of the cell 202.

A case 216 may at least partially enclose the cell 202. In some examples, the case 216 may include a polymer, a metal, or a combination thereof. The case 216 may be rigid. In various examples, the case 216 may protect the internal structures of the cell 202 from external forces.

A temperature sensor 218 may be configured to sense a temperature of the cell 202. Although only one temperature sensor 218 is illustrated in FIG. 2, in some cases, multiple additional temperature sensors can be configured to sense temperatures of the cell 202 at different locations throughout and/or along the cell 202. According to some examples, the temperature sensor 218 may be affixed to a side of the case 216 and/or the cell 202. According to some implementations, the temperature sensor 218 may be configured to sense a temperature of the first electrode 204 and/or the second electrode 206 (i.e., the anode and/or the cathode), where Joule heat may be significant due to contact resistance. The temperature sensor 218 may include a thermistor, a thermocouple, or a combination thereof. The location of the temperature sensor 218 can depend on the shape and/or construction of the cell 202. If the cell 202 is cylindrical, the cathode often extends down a center of the length of the cell 202, such that the temperature sensor 218 can be within a threshold distance of the cathode (e.g., contacting the cathode). Heat transport can be much faster in electrode materials (Al, Cu) than electrolyte and porous electrode active material. If the cell 202 is prismatic, the center of the largest face may be a location of the temperature sensor 218. In some examples, the critical location provides the fastest response to temperature change. By locating the temperature sensor 218 at the critical location, the temperature sensor 218 can provide a more accurate measurement of cell 202 temperature at a certain time to provide more time for decision making by a corresponding management system.

In some examples, the cell 202 can be prepared that have thermistors embedded inside of the cell 202 itself. Evaluations can be conducted under normal operation and in failure mode to determine temperature gradient and the rate it changes. The rate of change in temperature, for instance can be used by a management system to predict a failure event of the cell 202 and/or an SoH of the cell 202. In some examples, a predictive model predicts a failure event in the cell 202 based on the temperature measured by the temperature sensor 218. The temperature sensor 218 can be embedded within the case 216 or may be disposed on an outside surface of the case 216. The rates of change of current values and those compared with historical stored values are given more weight than the instantaneous value, in some examples.

According to some examples, the temperature sensor 118 includes a thermistor, which can sense temperature of the cell 102 faster and more accurately than a thermocouple and can therefore be used to identify erratic temperature changes. In some retrofit applications, a thermocouple could be used, for instance when the individual cell 202 cannot be isolated within a battery system and/or in large-format cells where the changes in skin temperature are slower due to the large mass. Some examples use thermocouples with an uninterruptable power supply (UPS).

In some cases, the temperature sensor 118 includes an optical (e.g., UV, IR, or the like) temperature sensor, which can be used to determine a temperature of the cell 102 using non-contact measurements. According to some examples, the temperature sensor 118 can include thermophotovoltaics where current generated is proportional to the contact temperature. In some examples, the temperature sensor 118 can include thermal imaging ICs or laser reflections of the case 216 for non-contact measurements.

A pressure sensor 220 may be configured to sense a pressure of the cell 202. Although only one pressure sensor 220 is illustrated in FIG. 2, in various examples, multiple additional pressure sensors can be configured to sense pressures of the cell 202 at various locations throughout and/or along the cell 202. In some cases, the pressure sensor 220 may measure a pressure along a long axis of the cell 202. For instance, the pressure sensor 220 may be mounted at a center of an external surface of the cell 202 in order to avoid a free edge effect. Examples of the pressure sensor 220 include, for instance, a 2-D strain gauge mounted on the side or top of the cell 202. Pressure measurements by the pressure sensor 220 can be calibrated based on resistance of the case 216 between longest length of side where strain-gauge is mounted (e.g., between positive and negative end of the cell 202). Deformation of the cell 202 may be constrained by the case 216, and strain gauge measurements by the pressure sensor 220 may not reflect real deformation in the free cell 202 (with no constraint from the case 216). A resistance (e.g., a structure stiffness) of the case 216 can be used to calibrate the pressure sensor 220. In some examples, more than one strain gauge can be used. In some implementations, a second strain gauge can help to obtain the shear deformation. To improve accuracy of the pressure sensor 220, a second gauge can be added, e.g., in the long axis direction (0 degree) of the cell 202. Some examples sense pressure or other mechanical properties using eddy-current deformation gauges and strain gauges. Other examples of the pressure sensor 220 include a pressure indicating film, laser based optical displacement sensor, etc. An optical displacement sensor is an example of a non-contact pressure sensor 220. Some examples use eddy-current deformation gauges, e.g., as described in papers by Auld et al. (J. NDE, 18:1, 1999, pp. 3-36) and Jiles et al. (NDT International, April 1990, pp. 83-92). In some examples, measurements by the pressure sensor 220 can be used to detect sudden evolution of bubble formation or vaporized electrolyte, e.g., by detecting an abrupt pressure increase. In some examples, the pressure sensor 220 can be located on the largest surface area of the cell 202. For example, if the cell 202 is cylindrical, the pressure sensor 220 can be located midway along a height of the cell 202 on a curved side of the cell 202. In some examples, the cell 202 is part of a system that is hermetically sealed, such that internal pressure(s) within the hermetically sealed system can be sensed by the pressure sensor 220.

A movement sensor 222 may be configured to sense a movement of the cell 202. Although only one movement sensor 222 is illustrated in FIG. 2, in some instances, multiple additional movement sensors can be configured to sense movement of the cell 202 at various locations throughout and/or along the cell 202. In some cases, the movement sensor 222 can be an accelerometer.

The cell circuit 200 may additionally include one or more electrical sensors, such as a voltage sensor 224, a current sensor 226, and a capacitance sensor 228. In some cases, any of the voltage sensor 222, the current sensor 224, or the capacitance sensor 226 may be combined into the same sensor circuit. The electrical sensors can be used to identify and/or predict various failure events, such as whether the separator 212 is defective or deteriorating, misalignment of the anode, separator 212, and the cathode; delaminated and defragmented material from the electrodes 204 to 206 that has been lodged between electrodes and separators or settles to one end; lack of electrolyte 208 and/or 210 or existence of bubbles due to poor assembly processes, breakdown (e.g., oxidation) of the electrolytes 208 due to overcharging, electrode 204 and/or 206 material in solution contaminating the electrolyte 208 and/or 210, dendrite 214 growth, or the like.

The voltage sensor 222 may be configured to sense a voltage between the first electrode 204 and the second electrode 206 of the cell 202. The current sensor 224 may be configured to sense a current that is input and/or output from the cell 202 (e.g., from the second electrode 206). The impedance (e.g., capacitance) sensor 226 may be configured to sense an impedance (e.g., a capacitance) of the cell 202. For example, the impedance sensor 226 may apply a current and/or voltage to the cell 202 (e.g., an AC or DC voltage) and sense a current and/or voltage of the cell 202 in response to the applied current and/or voltage.

In some examples, the impedance sensor 226 can apply, e.g., a 10 mVAC signal between 1 kHz and 10 MHz. Some examples measure a voltage response of the cell 202 and (amplitude and phase) while applying the AC voltage. In some examples, the AC voltage is applied to each cell, including the cell 202, or to a whole battery system including multiple cells. In some examples, the AC voltage is first applied to potentially critical cells. Model accuracy can be improved at the cost if increased measuring time by also measuring other cells. In some examples, the AC voltage is applied as a separate load current. With internal resistance of battery being relatively small, the voltage across battery can be processed by typical signal processor. In some examples, the AC is applied with a cycling circuit with the help of a relay (which may disconnect the cell 202 from the rest of the circuit 200 for testing). The AC test can be performed in the same manner as in ordinary cycling but with much higher cycling rate. In some examples, the AC pulse test can be used to analyze the capability of battery cells to survive high power output case. The results of the AC pulse test may also be used to derive the SoH of the cell 202.

In some cases, the impedance sensor 226 can inject a low voltage AC signal (from 1 kHz to 10 MHz) and calculate the capacitance of the cell 202 from the drop in magnitude and phase shift from input signal. These results can be compared to a previously established baseline (e.g., an average) based on previous capacitance measurements. Distinct dips in capacitance indicate reduced electrode capacitance due to dendritic growth 214 that effectively shortens the distance between the electrodes 204 and 206.

The impedance sensor 226 can detect electrolyte 208 or 210 leaks using AC or DC measurements. The resistance of the cell 202 may increase when a leak occurs. A low-amplitude (~10 mV) AC signal at 1 kHz can be used to determine the resistance of the cell 202. The initial or rated capacity (Ah) of the cell 202, age of the cell 202, and internal resistance of the cell 202, can be used to derive baseline characteristics of the cell 202. As capacity decreases, the internal resistance of the cell 202 increases proportionally. A sudden increase in resistance of the cell 202 is evidence of electrolyte 208 or 210 leakage. A decrease in resistance can indicate a soft short or that the dendrite 214 is developing, commonly known as the self-discharge resistance (SDR). A good cell fresh from the manufacturer may have an SDR greater than a threshold level, such as 1MΩ. As cells are cycled, dendritic growth increases as lithium ions are shuttled between the electrodes. Colder charge temperatures can accelerate dendritic formation. For instance, if the resistance of the cell 202 increases by a threshold amount of ohms within a predetermined (e.g., time) period, the management system may identify and/or predict that the electrolyte 208 or 210 is leaking, and may shut down the cell 202. In some cases, if the resistance of the cell 202 decreases by a threshold amount of ohms within a predetermined time period, the management system may identify and/or predict that the cell 202 is shorting or that the dendrite 214 is developing.

Some examples use transmission line methods to determine potential loss of conductivity in the cell 202. For instance, the impedance sensor 226 can apply a high current pulse C/5-rate for 1 ms to the cell in with a negative cable disconnected. A small reflection may be observed at a certain time following the pulse. If a voltage of the cell 202 is lost during operation, resending this pulse and comparing the reflection time to the time for the overall cell 202 can indicate where the circuit is broken.

In some examples, the impedance sensor can apply a DC load to the cell 202 for a fixed period of time. Some examples record voltage of the cell 202 during and after the application of DC load and monitor for abnormal temperature rise and cell deformation during DC loading. In some examples, the DC measurement is applied to the cell 202 selectively when the SoH of the cell 202 is questionable. The application of the DC load may be used for quick verification of SoH. In some examples, the nominal DC pulse shape can have a current level ~5C (5 times the one-hour nominal discharge current), Δt 1~5 s. In some examples, the pulse is applied using a battery analyzer (charger).

In some examples, the DC measurement can be an extra load applied to the cell 202 for a fixed period of time. Some examples measure, during or after the DC load, time to recover, voltage drop/increase, and/or load (current) increase/drop. Some examples use the real portion of the impedance of the cell 202 to and voltage decay to determine capacitance of the cell 202. Some examples calculate capacitance using the phase shift in voltage/current. Some examples apply the DC to an entire battery system including the cell 202 and measure across each cell and module. Some examples apply DC at C/10 rate (10% on top of rated charge current) for 1-10 ms. Some examples apply the DC by setting the charge current to C/10 value and using a solid-state relay to provide short pulse. If a charge current cannot be controlled by the battery system, a separate power supply or capacitor bank can be used to supply this current. Some examples use super-capacitors to analyze the battery system and/or the cell 202 where little battery capacity is used. For instance, two capacitor banks can be connected in parallel be charged by the cell 202 and/or the battery system. Then, the capacitor banks can be connected in series and can discharge back into the cell 202 and/or the battery system. In various implementations, voltage, current, time, and capacitor measurements can be used to find capacitance of the cell 202 and/or the battery system to indicates SoH.

The locations of the various sensors 218 to 228 can vary according to different implementations. In some cases, the sensors 218 to 228 can be arranged on various sides of the cell 202 depending on a structural design of the cell 202. For example, some cells 202 may be designed to include vents on one of various sides of the cell 202, which can affect the placement of the various sensors 218 to 228. For example, at least one of the sensors 218 to 228 can be located at a critical location within the pack. Some examples use pack level sensors. In some cases, an experimental integrated sensor network can be used to identify the critical location(s). Different types of sensors are embedded in potential locations for cell failure, and the data is collected for these preselected cells. When a location is observed to have high cell failure risk, it is determined as critical failure location in the pack. The critical location may be the position that is most vulnerable to damage or degradation. This will be reflected by sensors (i.e. abnormal temperature rise, abrupt efficiency drop, etc.). The critical location may vary based on battery failure modes (i.e. internal short, pulse discharge, dynamic load induced failure, etc.). Various testing conditions can be employed to introduce different failure modes and the critical location can be thoroughly analyzed.

According to some examples a critical location within multiple cells in a battery system can be defined, such that the cell is located at the critical location. For a pack, a centrally located cell may be monitored according to the cell circuit 200. Although any cell in the battery system can fail, cells on the periphery of the battery system tend to cool quicker than internal ones and do not pose as much as a risk. In some cases, all cells in the battery system can be temperature monitored like the cell 202.

In various implementations, the elements of the cell 202 may be physically arranged differently than the arrangement depicted in FIG. 2. In some cases, the cell 202 may be a cylindrical cell with a jelly roll (also referred to as a swiss roll) design. A stack of the first electrode 204, the separator 212, and the second electrode 206 may be rolled up into a cylinder. The cylinder (i.e., the roll) may be sealed with the case 216, and external contacts (e.g., metal contacts) may be disposed on an outer surface of the case 216, wherein the contacts may be connected to the first electrode 204 and the second electrode 206.

Figure 3:
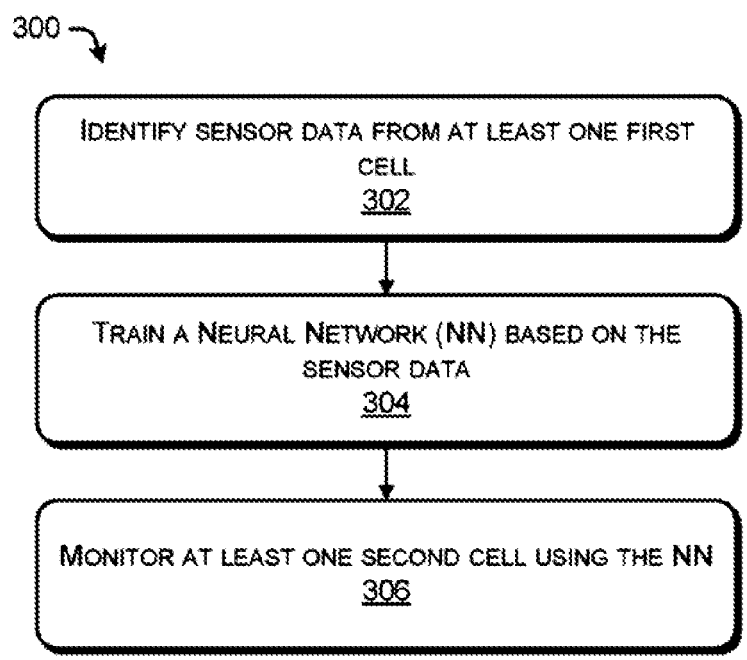
FIG. 3 illustrates an example computing system that can implement a SBMS according to various implementations described herein.

FIG. 3 illustrates an example process 300 for training a NN associated with an SBMS. The NN may be, for example, the predictive model 116 described above with FIG. 1. In various examples, the process 300 may performed by a computing system.

At 302, the process 300 may include identifying sensor data from at least one first cell. According to various examples, the sensor data may be received from one or more sensors associated with the first cell(s). The sensor data may indicate at least one of a pressure, a temperature, a movement, a voltage, a current, or a capacitance associated with the cell.

At 304, the process 300 can include training a NN based on the sensor data. In various cases, the NN can also be trained based on indications of whether the first cell(s) have undergone failure events during a time interval in which the sensor data was obtained. A failure event may be at least one of shorting, thermal runaway, an explosion, a breakdown, dendritic growth, piercing of cell separators within the first cell(s), or the like.

At 306, the process 300 can include monitoring at least one second cell using the NN. The second cell(s) may be different than the first cell(s). According to some examples, the second cell(s) may share at least one characteristic with the first cell(s). For example, the second cell(s) and the first cell(s) may share the same electrochemistry, design, application, use, networked environment (e.g., they may be connected within a battery system in the same way), or the like.

Figure 4:
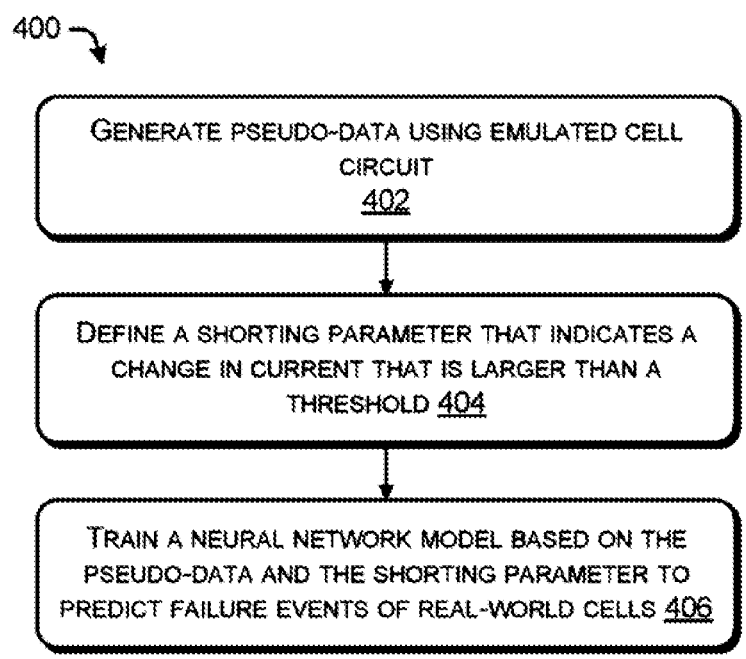
FIG. 4 illustrates an example process for training a Neural Network (NN) associated with an SBMS.

FIG. 4 illustrates an example process 400 for training a NN based on pseudo-data obtained by emulating a cell circuit. The NN may be, for example, the predictive model 116 described above with FIG. 1. In various examples, the process 400 may performed by a computing system.

At 402, pseudo-data using an emulated cell circuit is generated. In various examples, the pseudo-data may be obtained using an Arduino. The emulated cell circuit may include a software program (e.g., an Application Programming Interface (API), a Virtual Machine (VM), or the like) that is generated based on previously obtained data from real-world cells and/or sensors. The pseudo-data may include emulated sensor data. For example, the pseudo-data may indicate at least one of a pressure, a temperature, a movement, a voltage, a current, or a capacitance of the emulated cell circuit. An input to the emulated cell circuit may include a condition of the cell circuit. For example, the input may include at least one of a pressure, a temperature, a movement, a voltage, a current, a capacitance, or some other operating condition of the emulated cell circuit. In some cases, the input may indicate a different type of sensor data than the pseudo-data.

At 404, a shorting parameter is defined. The shorting parameter may indicate a change in current that is larger than a threshold. In some cases, the shorting parameter may have a binary (e.g., a Boolean) data type. For example, the shorting parameter may be at a first level (e.g., "0") when the cell circuit is in operation and may be at a second level (e.g., "1") when the cell circuit has undergone a failure event (e.g., thermal runaway). At 406, an NN model is trained based on the pseudo-data and the shorting parameter to predict failure events of real-world cells.

Figure 5:
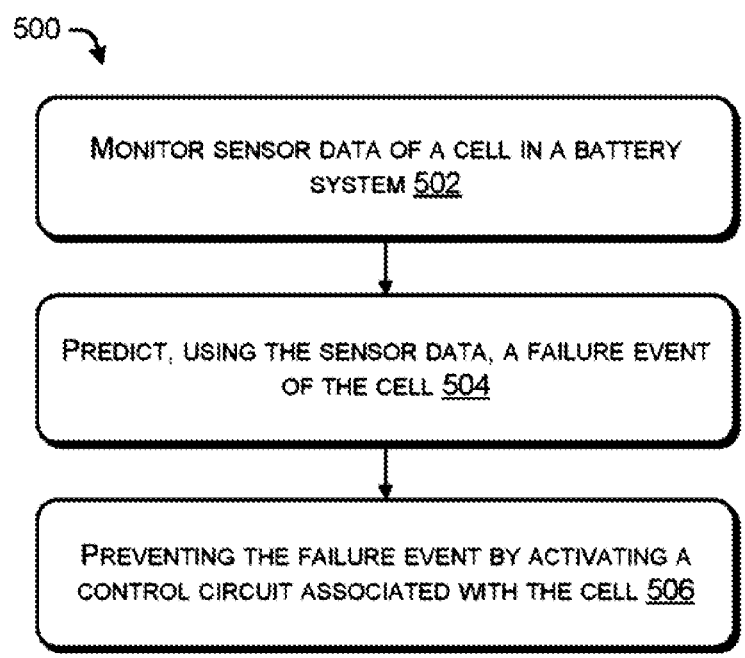
FIG. 5 illustrates an example process for training a NN based on pseudo-data obtained by emulating a cell circuit.

FIG. 5 illustrates an example process 500 for detecting and preventing a failure event of a cell based on sensor data. In various examples, the process 500 may performed by a computing system. For instance, the process 500 may be performed by the management system 114 described above with reference with FIG. 1.

At 502, the process 500 includes monitoring sensor data of a cell in a battery system. In various cases, the sensor data may be received from at least one sensor associated with the cell. The sensor data may indicate one or more metrics of the cell, such as at least one of a pressure, a temperature, a movement, a voltage, a current, or a capacitance of the cell.

At 504, the process 500 includes predicting a failure event of the cell using the sensor data. In some implementations, a predictive model can be used to predict the failure event based on the sensor data. For instance, a trained neural network can be used to predict the failure event.

At 506, the process 500 includes preventing the failure event by activating a control circuit associated with the cell. In various implementations, the control circuit may disconnect, shunt, and/or load balance (e.g., control the current) of the cell in such a way that prevents the occurrence of the failure event.

Figure 6:
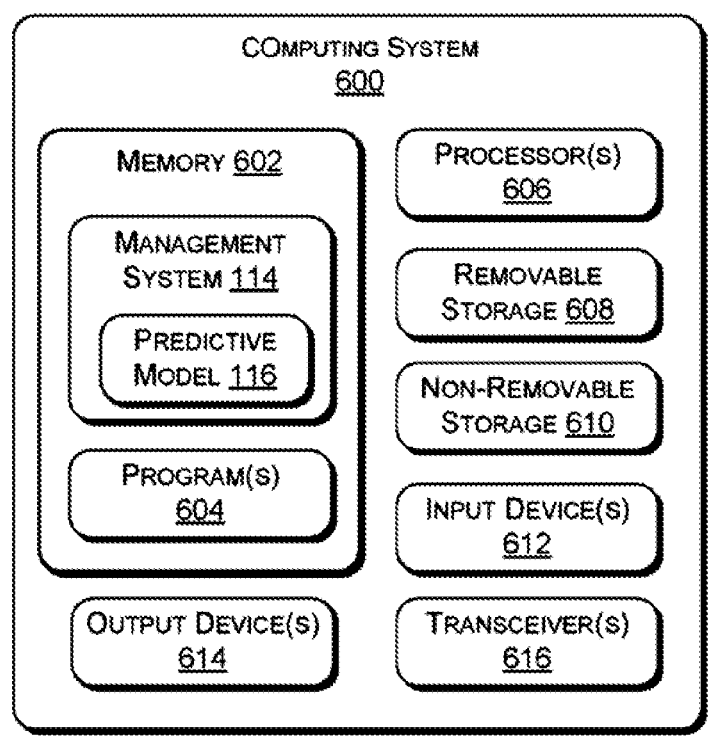
FIG. 6 illustrates an example process for detecting and preventing a failure event of a cell based on sensor data.

FIG. 6 illustrates an example computing system 600 that can implement a SBMS according to various implementations described herein. According to various examples, the computing system 600 can perform any of the processes 300, 400, or 500 described above with reference to FIGS. 3-5.

The computing system 600 can comprise a memory 602. In various embodiments, the memory 602 is volatile (including a component such as Random Access Memory (RAM)), non-volatile (including a component such as Read Only Memory (ROM), flash memory, etc.) or some combination of the two. The memory 602 may include various components, such as the management system 114, the predictive model 116, as well as at least one program 604. The management system 114 and/or the predictive model 116 can comprise methods, threads, processes, applications, or any other sort of executable instructions. The management system 114, the predictive model 116, and the program(s) 604, and various other elements stored in the memory 602, can also include files and databases.

The memory 602 may include various instructions (e.g., instructions in the management system 114, predictive model 116, and/or the program(s) 604), which can be executed by at least one processor 606 to perform operations. In some embodiments, the processor(s) 610 includes a Central Processing Unit (CPU), a Graphics Processing Unit (GPU), or both CPU and GPU, or other processing unit or component known in the art.

Processor 606 can be communicatively connected to an external network, e.g., the Internet or a leased line. Processor 606, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 606 can implement processes of various aspects described herein. Processor 606 and related components can, e.g., carry out processes for training or operating computational models (CMs), such as neural networks, or for operating battery systems, e.g., by measuring batteries, cells, or packs, and disconnecting or shutting down cells based on model outputs.

Processor 606 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 220, user interface system 230, and data storage system 240 are shown separately from the processor 286 but can be stored completely or partially within the processor 286.

The computing system 600 can also include additional data storage devices (removable and/or non-removable) such as, for example, magnetic disks, optical disks, or tape. Such additional storage can include removable storage 608 and non-removable storage 610. Tangible computer-readable media can include volatile and nonvolatile, removable and non-removable media implemented in any method or technology for storage of information, such as computer readable instructions, data structures, program modules, or other data. The memory 602, removable storage 608, and non-removable storage 610 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the computing system 600. Any such tangible computer-readable media can be part of the computing system 600.

The computing system 600 also can include input device(s) 612, such as a keypad, a cursor control, a touch-sensitive display, voice input device, etc., and output device(s) 614 such as a display, speakers, printers, etc. These devices are well known in the art and need not be discussed at length here. In particular implementations, a user can provide input to computing system 600 via a user interface associated with the input device(s) 612 and/or the output device(s) 614.

The input and output device(s) 612 and 614 can include or be communicatively connected with one or more devices configured or otherwise adapted to provide digital content records to the processor 606 or to take action in response to processor 606. For example, the input and output device(s) 612 and 614 can include digital still cameras, digital video cameras, cellular phones, or other data processors. The processor 606, upon receipt of digital content records from a device in the input device(s) 612, can store such digital content records in the memory 602.

In various cases, the input and output device(s) 612 and 614 can communicate with one or more sensors, e.g., temperature, pressure, voltage, current, or other sensors described in herein. The sensors can measure and/or record characteristics of one or batteries, cells, packs, or other battery assemblies. The input device(s) 612 can provide sensor data to the processor 606, e.g., for use in training computational models (CMs) (e.g., neural networks), or for use in operating CMs to predict battery failure, determine battery SoH, or otherwise analyze or predict operation of battery. Examples of training and operation of CMs are described herein.

In some examples, the battery can be a synthetic battery. For example, as described in herein 1, an Arduino or other microcontroller can simulate operation or characteristics of a battery. A synthetic battery can be operated, and monitored during operation by sensor(s), to provide training data without requiring physically destroying actual batteries.

In some cases the input and output device(s) 612 and 614 can be associated with a UI. The UI can convey information in either direction, or in both directions, between a user and the processor 606 or other components of computing system 600. The UI can include and/or be associated with a mouse, a keyboard, another computer (connected, e.g., via a network or a null-modem cable), or any device or combination of devices from which data is input to the processor 606. The UI can include and/or be associated with a display device, a processor-accessible memory, or any device or combination of devices to which data is output by the processor 606.

The computing system 600 can also include one or more wired or wireless transceiver(s) 616. For example, the transceiver(s) 616 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 616 can utilize Multiple-Input/Multiple-Output (MIMO) technology. The transceiver(s) 616 can include any sort of wireless transceivers capable of engaging in wireless, Radio Frequency (RF) communication. The transceiver(s) 616 can also include other wireless modems, such as a modem for engaging in Wi-Fi, WiMAX, Bluetooth, infrared, or some other specifically developed wireless communication protocol.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 606 (and possibly also other processors), and that, when loaded into processor 606, cause functions, acts, or operational steps of various aspects herein to be performed by processor 606 (or other processor). Computer program code for carrying out operations for various aspects described herein may be written in any combination of one or more programming language(s), and can be loaded from CRM into code memory for execution. The program code may execute, e.g., entirely on processor 606, partly on processor 606 and partly on a remote computer connected to the network, or entirely on the remote computer.

In some examples, the processor 606 and, if required, the memory 602 or portions thereof, are referred to for brevity herein as a "control unit." For example, a control unit can include a CPU or DSP and a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media (e.g., CRM 243) storing executable instructions.

An example of the predictive model 116 includes a deep neural network (DNN) to predict failures. The machine learning model can be implemented as a classification algorithm using MATLAB. Given signals as a function of time, this model can classify various tests on an example cell as safe or unsafe for each time interval. The input to the model can include metrics of like voltage, current, temperature. The output can include a parameter indicating whether the cell has experienced a failure event (e.g., shorted), or is about to experience a failure event, or not. In some examples, the predictive model 116 includes multiple NNs associated with respective components of an entire assembly (e.g., individual batteries, cells, or packs) in order to increase the accuracy of the predictive model 116. Example inputs of the DNN include temperature, pressure, voltage, current, and the like, which may be provided by a range of sensors. Example outputs of the DNN include a binary output, indicating which cell should be shutdown. The predictive model 116 can use current and historical measurements from voltage, current, temperature, and strain-gauge sensors in determining risk of failure. In various cases, strain and deformation can be utilized by the predictive model 116 for predicting failure events. Strain and deformation can be judged from a combination of pressure and eddy current sensors output of whose is in the form of voltage and current. Historical measurements can be separate inputs. SoH can be a separate input. A binary output of the predictive model 116 can be generated based on a combination of voltage, pressure, current, temperature, and SoH to make decision to stop/cut-off cell or not.

Figure 7:
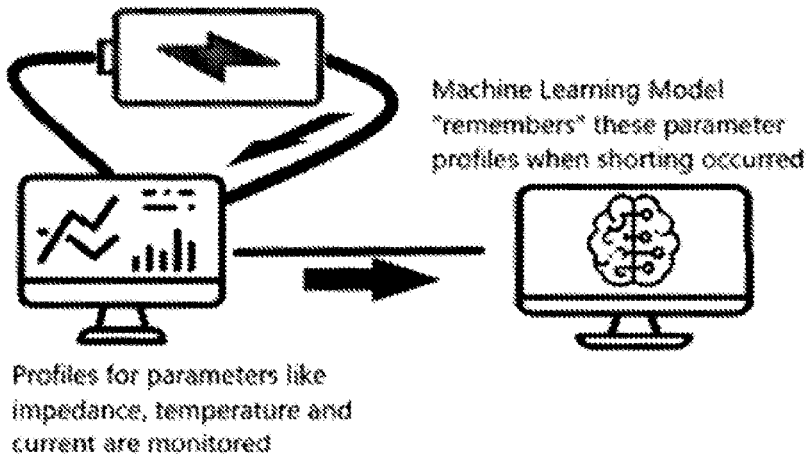
FIG. 7 illustrates examples of attack and defense steps according to various implementations of the present disclosure.
Figure 7:
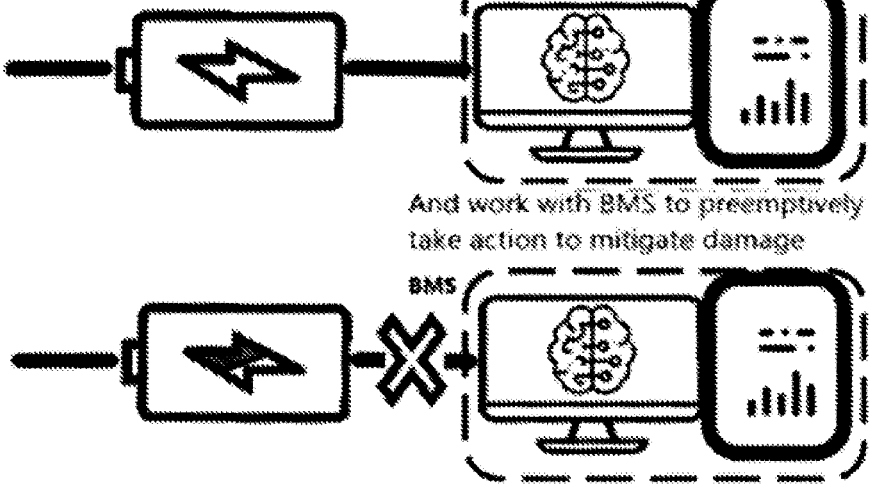

FIG. 7 illustrates examples of attack and defense steps according to various implementations of the present disclosure.

Lithium ion batteries can be subject to events like thermal runaway during their operational lifetimes. Thermal runaway can lead to fires and explosions, and at the very least leave long lasting damage to a lithium ion battery which may decrease its quality and duration of use. An ML approach can be used to predict and preemptively stop possible modes of failure in order to limit damage to lithium ion batteries and provide a reliable estimation of SoH.

The method used for this solution can involves both "Attack" and "Defense" steps. For the "attack" step, different imposed conditions are considered for a lithium ion battery subject to thermal runaway, external puncture, etc. Parameters such as current, internal impedance and voltage are monitored during the testing of these attack cases. An ML model can then be trained as part of the "defense" portion of the solution, learning the behavior of these parameters when the battery is in distress.

The ML approach can be implemented by generating data to train a model. In some examples, the data can be generated with a circuit connected with an Arduino and a lithium ion battery. A computer model can control and/or identify when the battery was shorted (closed) or not (open). This shorting event is meant to represent what happens to a lithium ion battery during a possible occurrence of thermal runaway.

In some cases, the ML approach can be implemented using MATLAB's built-in Classification Learner. A final matrix of compiled current, time, and shorting classification (0 or 1) can fed into the module as predictor, predictor, and response, respectively. This method can effectively overlays every current vs. time graph.

For each time interval, represented by a point, MATLAB's model has predicted whether shorting has occurred. The ML software can use the current and time, as well as the shorting parameter within each test to learn how a shorted signal might behave. The exported model may be trained and then be used to predict future battery failures given current and time data.

Figure 8:
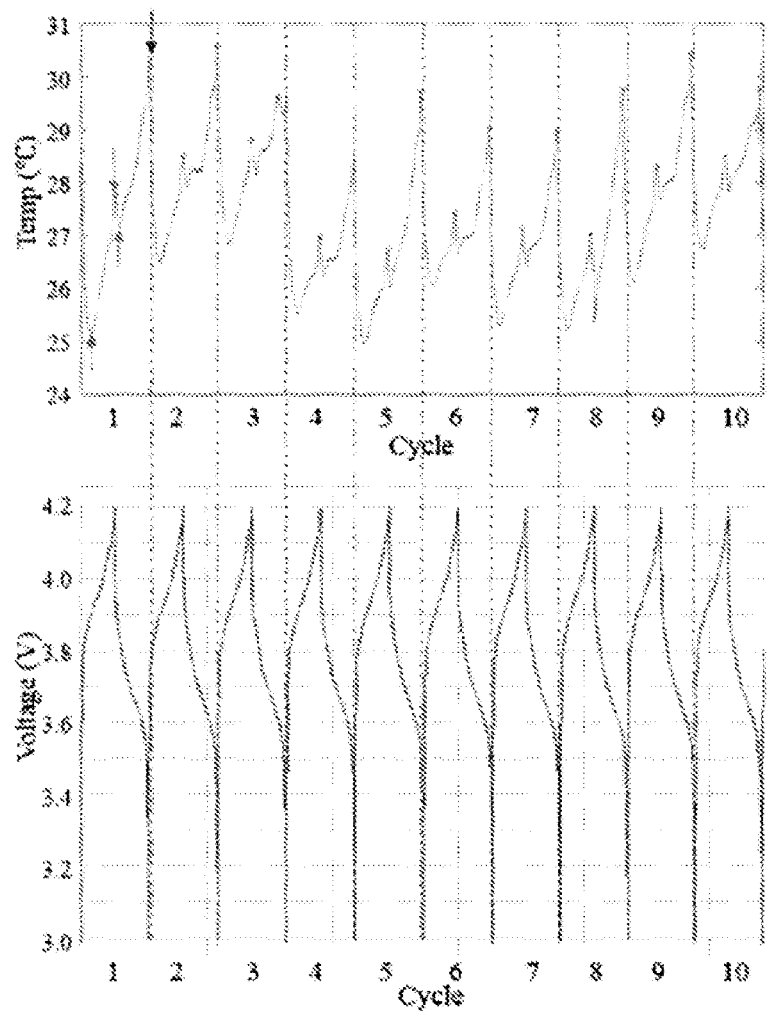
FIG. 8 illustrates example temperature and voltage measurements of an example cell over the course of several charge-discharge cycles.

FIG. 8 illustrates example temperature and voltage measurements of an example cell over the course of several charge-discharge cycles. As illustrated, during battery cycling over vibration, a periodic battery temperature change can be observed. A comparable change of temperature can be observed in charging and discharging processes, such that a Coulombic efficiency may be about 100%. As illustrated, the temperature measurements demonstrate two peaks and two valleys in each charge/discharge cycle. A difference in temperature level between cycles can be used to identify differences in cycling capacity.

Figure 9:
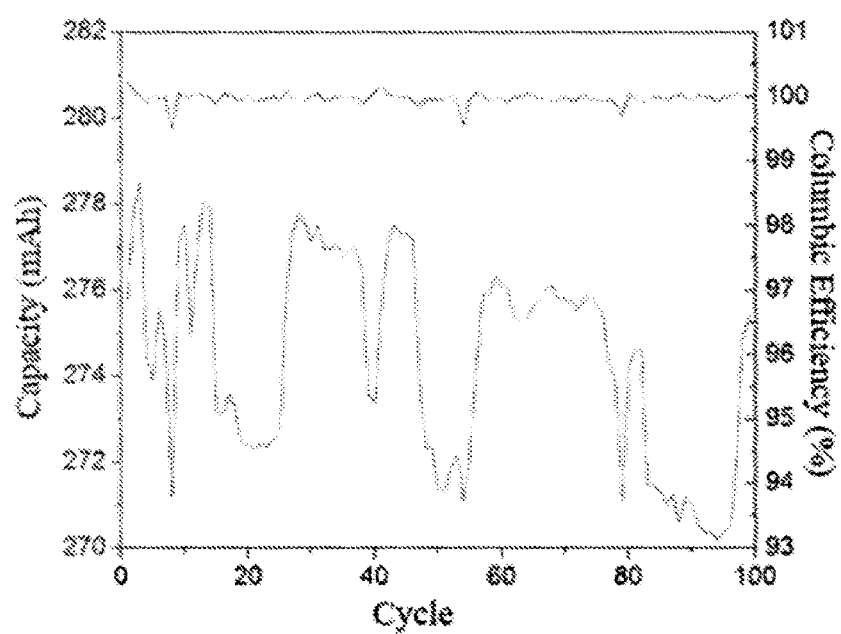
FIG. 9 illustrates example capacity and columbic efficiency of an example cell over the course of the cell's lifetime.

FIG. 9 illustrates example capacity and Coulombic efficiency of an example cell over the course of the cell's lifetime. In the graph illustrated in FIG. 9, the upper line represents Columbic efficiency and the lower line represents capacity. As illustrated, during battery cycling, high columbic efficiency (about 100%) characteristics can be predictable for battery performance, particularly in the discharging cycle. A fluctuation in battery capacity may decrease. Accordingly, temperature measurements can be used in addition to capacity in order to predict battery SoH.

In view of the foregoing, various aspects provide measurement of battery operating characteristics, and prediction of battery failure. A technical effect is to disconnect batteries that are likely to fail before they do so. A further technical effect is to present a visual representation of battery SoH, or temperatures, pressures, or other data throughout a pack or other group of multiple cells, on an electronic display.

This disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example processes herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and processes described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing systems or processors, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

Although the subject matter has been described in language specific to structural features and/or methodological acts, it is to be understood that the subject matter defined in the appended claims is not necessarily limited to the specific features or acts described.

The invention claimed is:

1. A method for managing a battery system, comprising:
   receiving sensor data from sensors configured to measure one or more metrics of a cell in a battery system;
   predicting a failure event of the cell; and
   preventing the failure event by activating a control circuit coupled to the cell, wherein the sensor data sensors configured to measure one or more metrics of a plurality of cells in a battery,
   wherein the metrics comprise at least movement of the cell obtained from at least one movement sensor, and
   wherein the metrics further comprise at least one of a pressure obtained from at least one pressure sensor, a temperature obtained from at least one temperature sensor, a voltage obtained from at least one voltage sensor, a current obtained from at least one current sensor, a resistance obtained from at least one resistance sensor, an impedance obtained from at least one impedance sensor, or a capacitance obtained from at least one capacitance sensor, each associated with the cell.

2. The method of claim 1, wherein the step of predicting is based on the sensor data, the failure event is predicted by a neural network.

3. The method of claim 2, the sensor data being first sensor data, the cell being a first cell, and the failure event being a first failure event, the method further comprising:
   identifying second sensor data of a second cell, the second sensor data being obtained during at least one second failure event of the second cell; and
   training the neural network based on the second sensor data and an indication of the at least one second failure event.

4. The method of claim 1, wherein the failure event comprises thermal runaway of the cell.

5. The method of claim 1, wherein activating the control circuit comprises:
   causing the control circuit to modify a current flowing through the cell, including causing to disconnect the cell from one or more additional cells in the battery system.

6. The method of claim 1, wherein preventing the failure event comprises:
   providing the acceleration data obtained from the at least one movement sensor.

7. The method of claim 6, further comprising:
   predicting by inputting data from the at least one movement sensor into the trained neural network, a failure event of the cell based on the associated movement data from the cell.

8. The method of claim 7, further comprising:
   disconnecting the cell from the one or more additional cells in response to the prediction of the trained neural network.

9. A Smart Battery Management System, comprising:
   at least one processor; and
   non-transient memory storing instructions that, when executed by the at least one processor cause the at least one processor to perform operations comprising:
   identifying sensor data of a cell in a battery system;
   predicting, based on the sensor data, a failure event of the cell; and
   preventing the failure event by activating a control circuit connected to the cell, wherein the metrics comprise at least movement of the cell obtained from at least one movement sensor, and wherein the metrics further comprise at least one of a pressure obtained from at least one pressure sensor, a temperature obtained from at least one temperature sensor, a voltage obtained from at least one voltage sensor, a current obtained from at least one current sensor, a resistance obtained from at least one resistance sensor, an impedance obtained from at least one impedance sensor, or a capacitance obtained from at least one capacitance sensor, each associated with the cell.

10. The system of claim 9, wherein predicting is based on the sensor data, the failure event is predicted by a neural network.

11. The system of claim 10, the sensor data being first sensor data, the cell being a first cell, and the failure event being a first failure event, the processor further performs:
identifying second sensor data of a second cell, the second sensor data being obtained during at least one second failure event of the second cell; and
training the neural network based on the second sensor data and an indication of the at least one second failure event.

12. The system of claim 9, wherein the failure event comprises thermal runaway of the cell.

13. The system of claim 9, wherein activating the control circuit comprises:
causing the control circuit to modify a current flowing through the cell, including causing to disconnect the cell from one or more additional cells in the battery system.

14. The system of claim 9, wherein preventing the failure event comprises:
providing acceleration data obtained from the at least one movement sensor.

15. The system of claim 14, further comprising:
by inputting data from the at least one movement sensor into a trained neural network, thereby predicting the failure event of the cell based on the associated movement data from the cell.

16. The system of claim 15, further comprising:
disconnecting the cell from the one or more additional cells in response to the prediction of the trained neural network.

17. A method for managing a battery system, comprising:
receiving sensor data from sensors configured to measure one or more metrics of a cell in a battery system;
predicting a failure event of the cell; and
preventing the failure event by activating a control circuit coupled to the cell, wherein the sensor data sensors configured to measure one or more metrics of a plurality of cells in a battery,
wherein the step of predicting a failure event is based on the sensor data and predicted by a neural network, and
wherein the sensor data being first sensor data, the cell being a first cell, and the failure event being a first failure event, the method further comprising:
identifying second sensor data of a second cell, the second sensor data being obtained during at least one second failure event of the second cell; and
training the neural network based on the second sensor data and an indication of the at least one second failure event.

18. A Smart Battery Management System, comprising:
at least one processor; and
non-transient memory storing instructions that, when executed by the at least one processor cause the at least one processor to perform operations comprising:
identifying sensor data of a cell in a battery system;
predicting, based on the sensor data, a failure event of the cell; and
preventing the failure event by activating a control circuit connected to the cell,
wherein predicting is based on the sensor data, the failure event is predicted by a neural network, and
wherein the sensor data being first sensor data, the cell being a first cell, and the failure event being a first failure event, the processor further performs:
identifying second sensor data of a second cell, the second sensor data being obtained during at least one second failure event of the second cell; and
training the neural network based on the second sensor data and an indication of the at least one second failure event.

19. A Smart Battery Management System, comprising:
at least one processor; and
non-transient memory storing instructions that, when executed by the at least one processor cause the at least one processor to perform operations comprising:
identifying sensor data of a cell in a battery system;
predicting, based on the sensor data, a failure event of the cell; and
preventing the failure event by activating a control circuit connected to the cell,
wherein preventing the failure event comprises:
providing the acceleration data obtained from at least one movement sensor, and
by inputting data from the at least one movement sensor into a trained neural network thereby predicting the failure event of the cell based on the associated movement data from the cell.

* * * * *